(12) United States Patent
Wang et al.

(10) Patent No.: US 8,717,783 B2
(45) Date of Patent: May 6, 2014

(54) METHOD AND APPARATUS FOR REGULATING GAIN WITHIN A RESONANT CONVERTER

(75) Inventors: Bin Wang, Shanghai (CN); Hongyang Wu, Shanghai (CN); Chao Yan, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 391 days.

(21) Appl. No.: 12/909,534

(22) Filed: Oct. 21, 2010

(65) Prior Publication Data
US 2011/0103097 A1 May 5, 2011

Related U.S. Application Data

(60) Provisional application No. 61/256,625, filed on Oct. 30, 2009.

(51) Int. Cl.
*H02M 3/335* (2006.01)

(52) U.S. Cl.
USPC .................................. 363/21.02; 363/17

(58) Field of Classification Search
USPC ......... 363/21.02, 21.03, 21.06, 21.14, 97, 98, 363/127, 16, 17
See application file for complete search history.

(56) References Cited

U.S. PATENT DOCUMENTS

| 7,158,392 | B2 * | 1/2007 | Hosokawa et al. | 363/21.06 |
|---|---|---|---|---|
| 7,184,280 | B2 * | 2/2007 | Sun et al. | 363/21.02 |
| 7,616,457 | B2 * | 11/2009 | Yang | 363/21.06 |
| 7,796,406 | B2 * | 9/2010 | Lev | 363/21.02 |
| 2001/0036088 | A1 * | 11/2001 | Wittenbreder, Jr. | 363/17 |
| 2008/0025049 | A1 | 1/2008 | Spindler | |
| 2008/0025050 | A1 | 1/2008 | Spindler | |
| 2010/0172157 | A1 * | 7/2010 | Chen et al. | 363/21.02 |
| 2010/0182803 | A1 * | 7/2010 | Nan et al. | 363/21.02 |

FOREIGN PATENT DOCUMENTS

| CN | 100539379C | C | 1/2006 |
|---|---|---|---|
| CN | 101291110A | A | 10/2008 |
| TW | 200841575A | A | 10/2008 |
| TW | I313102 | B | 8/2009 |
| WO | WO 2008/009538 | A1 | 1/2008 |

OTHER PUBLICATIONS

China Office Action dated Aug. 14, 2013.
Taiwan Office Action dated Jul. 29, 2013.

* cited by examiner

*Primary Examiner* — Gary L Laxton
(74) *Attorney, Agent, or Firm* — Morris Manning & Martin LLP; Tim Tingkang Xia, Esq.

(57) ABSTRACT

A method for controlling a direct current gain of a resonant converter to increase power efficiency within a circuit. A phase shift module is configured to the resonant converter for generating a first control signal to control a primary driver of the resonant converter and a secondary control signal to control a secondary driver of the resonant converter. The first control signal and the secondary control signal have a phase shift for controlling a DC gain of the resonant converter.

24 Claims, 24 Drawing Sheets

404

408

METHOD AND APPARATUS FOR REGULATING GAIN WITHIN A RESONANT CONVERTER

RELATED APPLICATIONS

This application claims the benefit of the earlier filing date under 35 U.S.C. §119(e) of U.S. Provisional Application Ser. No. 61/256,625 filed Oct. 30, 2009, entitled "Method and Apparatus for Phase Shift Control"; the entirety of which is incorporated herein by reference.

BACKGROUND

Effective control and application of power is a major consideration in the development of consumer and industrial electronic products. One form of power conversion system employed today is a resonant converter, which is comprised of inductor-capacitor (L-C) networks of various configurations for shaping the waveform of either the current or the voltage being driven across a given switching element of the circuitry. While various electrical components may be used in the design of a resonant converter, synchronous rectifiers (SRs) are often used in applications that require conversion of alternating current (AC) to direct current (DC). SRs are electronic components encompassing a diode and a transistor (typically a power metal-oxide-semiconductor field-effect transistor (MOSFET)) connected in parallel. In operation, when the diode is forward-biased, the transistor is turned on to reduce the voltage drop. This minimizes the overall energy loss within the circuitry, ensuring that power is persistently switched on or off during and throughout the circuit's operation.

In some instances, the SRs are turned on by a secondary driver of the resonant circuit earlier than the primary driver for the other switching elements of the circuit to reduce the loss caused by the current flowing through the body diodes of the SRs. Consequently, this introduces a phase delay between the secondary driver of the SRs and the primary driver of the other switching elements of the resonant converter, wherein the driver of the SRs is ahead of that of the corresponding switching elements a diode-conducting period/phase degree that the body diodes conduct before the corresponding primary switching elements. Whether SRs are used or not, the resonant converter encounters a problem that the DC voltage gain (nVo/Vin) is non-monotonic within the circuitry, where multiple different frequency levels may correspond to the exact same gain level. Furthermore, the DC gain cannot be zero or near to zero no matter how to vary the frequency of the resonant converter. These diminish the converters 101 effectiveness as a power control mechanism within an electronic application or consumer device; where it is desired to achieve a stable, monotonic (e.g., linear) gain response along with frequency/shifted phase angle or other variable to prevent component damage, and to obtain a zero DC gain to get a smoothing startup waveform from zero voltage.

SOME EXAMPLE EMBODIMENTS

Therefore, there is a need for an approach to regulating a phase delay within a resonant converter to achieve an optimal direct current gain.

According to one embodiment, an apparatus comprises a delay circuit. The apparatus also comprises a control module coupled to the delay circuit, and configured to output to the delay circuit for generating a first control signal to control a primary driver of a resonant converter in response to an output voltage of the resonant converter, and to generate a secondary control signal to control a secondary driver of the resonant converter. The first control signal and the secondary control signal of the control module have a phase shift for controlling a DC gain of the resonant converter.

According to yet another embodiment, a method comprises generating a first control signal to control a primary driver of a resonant converter. The method also comprises generating a secondary control signal to control a secondary driver of the resonant converter. The first control signal and the secondary control signal have a phase shift for controlling a DC gain of the resonant converter.

Still other aspects, features and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method and apparatus for controlling a direct current gain of a resonant converter within a circuit are disclosed. In the following description, for the purposes of explanation, numerous specific details are set forth to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form to avoid unnecessary obscuring the embodiments of the invention.

Figure 1:
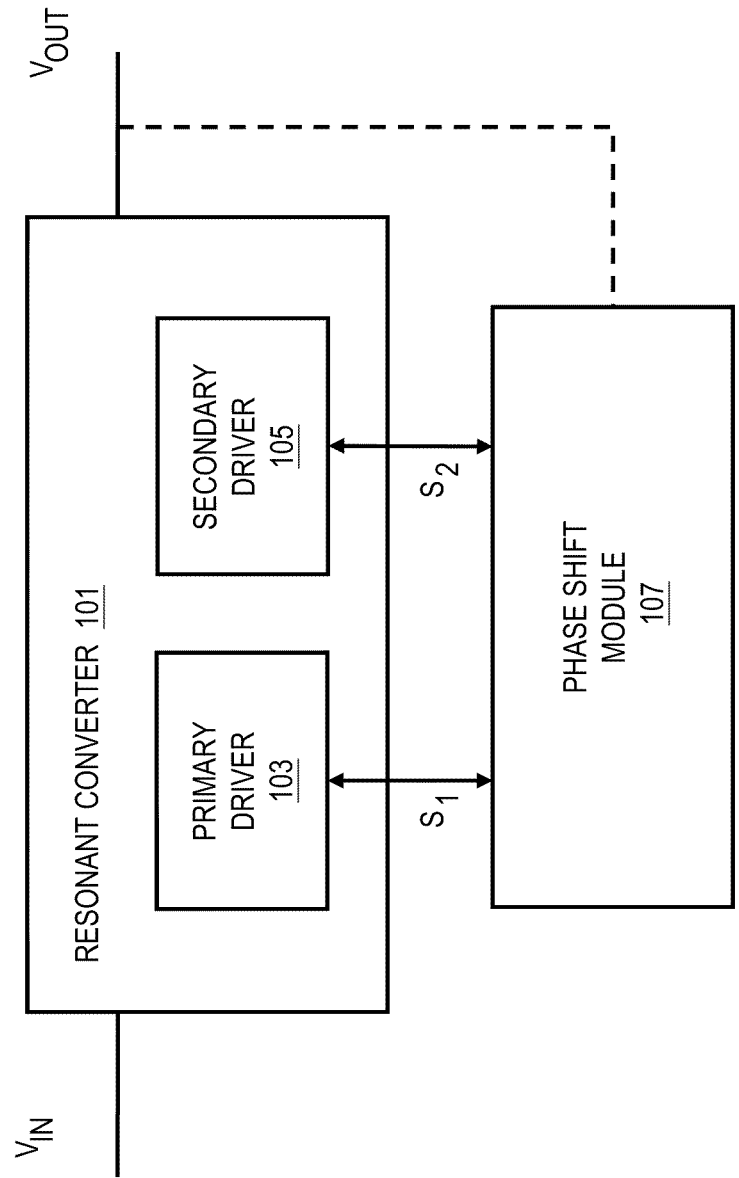
FIG. 1 is a block diagram depicting a resonant converter configured with a phase shift module for regulating DC gain within the resonant converter, in accordance with an exemplary embodiment.

FIG. 1 is a block diagram depicting a resonant converter configured with a phase shift module for regulating DC gain within the resonant converter, in accordance with an exemplary embodiment. A resonant converter 101 is a form of power converter that is useful for electronic applications requiring efficient switching of power within a circuit while achieving limited power loss. Comprised of inductor-capacitor (L-C) networks of various configurations, resonant converters 101 use circuit capacitances and inductances to shape the waveform of either the current or the voltage being driven across a given switching element, e.g., a transistor coupled to a steering diode.

Synchronous rectifiers (SRs), as mentioned, are often used as an active switch and are particularly useful in applications where a converter operates with high efficiency, such as in resonant converters 101. By synchronous, it is intended to suggest that the SR circuitry can be driven in a timed manner relative to the application at hand, i.e., by a SR driver 105 also referred to as a secondary driver 105. In other instances, however, synchronous rectifiers are known as active rectifiers to indicate the active (synchronized) controlling of the metal-oxide-semiconductor field-effect transistor MOSFET gate timing as used in conjunction with a diode to implement the SR. By way of example, the term "synchronous rectifier" is used throughout the description herein to include all categories of driven or timed switching elements. A depiction of synchronous rectifiers 201 and 203 as implemented within a resonant converter circuit is shown with respect to FIG. 2, according to an exemplary embodiment.

As described above, SRs such as 201 and 203 typically include a diode connected in parallel with a transistor, i.e., a power MOSFET.

According to various embodiments, resonant converter 101 also includes one or more primary switching elements, e.g. 201a-b (Q2, Q3) and 203a-b (Q1, Q4) may be implemented using Mosfet, BJT, IGBT etc. The primary switching elements are driven by the primary side driver 103 and the SRs are driven by the secondary side driver 105. And there is effectively no phase delay between the secondary driver 105 for driving the SRs and the primary driver 103 for driving the primary switching elements of the resonant converter 101, resulting in the SRs 201 and 203 being turned on at the same time as its corresponding primary switching elements, namely elements 201a-201b for SR 201 and 203a-203b for SR 203.

Unfortunately, power loss occurs as a result of current flowing through the body diodes of SRs 201 and 203 before they are actually activated by the secondary driver 105 of the circuit. To thwart this unwanted loss, the SRs 201 and 203 may be turned on by the secondary driver 105 slightly earlier than the primary driver 103 for engaging switching elements 201a-b and 203a-b to reduce loss. Consequently, this introduces a phase differential response between SRs 201 and 203 and that of the primary switching elements 201a-b and 203a-b; the SRs now being turned on earlier than the corresponding primary switching elements ahead of a diode-conducting period/phase degree that the body diodes of SRs conduct before the corresponding primary switching elements, where the primary switching elements have a constant time delay. Whether SRs are used or not, the resonant converter encounters a problem that the DC voltage gain (nVo/Vin) is non-monotonic (e.g., sinusoidal) within the circuitry, where multiple different frequency levels may correspond to the exact same gain level. Furthermore, the DC gain cannot be zero or near to zero no matter how to vary the frequency of the resonant converter. These diminish the converters 101 effectiveness as a power control mechanism within an electronic application or consumer device; where it is desired to achieve a stable, monotonic (e.g., linear) gain response along with frequency/shifted phase angle or other variable to prevent component damage, and to obtain a zero DC gain to get a smoothing startup waveform from zero voltage.

To address these issue, system 100 of FIG. 1 comprises a resonant converter 101 that is configured with a phase shift module 107. As shown, the phase shift module 107 is electrically connected to the primary driver 103 of the switching elements of the resonant converter 101 and secondary driver 105 of the synchronous rectifiers of the resonant converter 101. In operation, the phase shift module 107 generates a control signal $S_1$ for controlling or altering the drive signal output by the primary driver 103 and a control signal $S_2$ for controlling or altering the drive signal output by the secondary driver 105. Respective control signals are conditioned by the phase shift module 107 to operate at a frequency that compensates for a phase shift or delay between the first 103 and secondary 105 drivers of the resonant converter 101 to get a monotonic DC gain. The phase shift degree is defined as the phase difference between the turning on of SRs 203 and 205 (by the secondary driver 105) and its corresponding primary switching elements 201a-b and 203a-b (by the primary driver 103). By regulating this phase difference, the DC gain of the resonant converter is effectively lowered and/or maintained monotonically along with frequency. Specifically, where there is a time lag between respective drivers 103 and 105, such that the primary driver signal 103 lags the secondary driver (SR driver) 105 by a phase degree α, the phase shift module 107 introduces a compensatory time delay signal $S_1$ in the primary driver 103.

Figure 2:
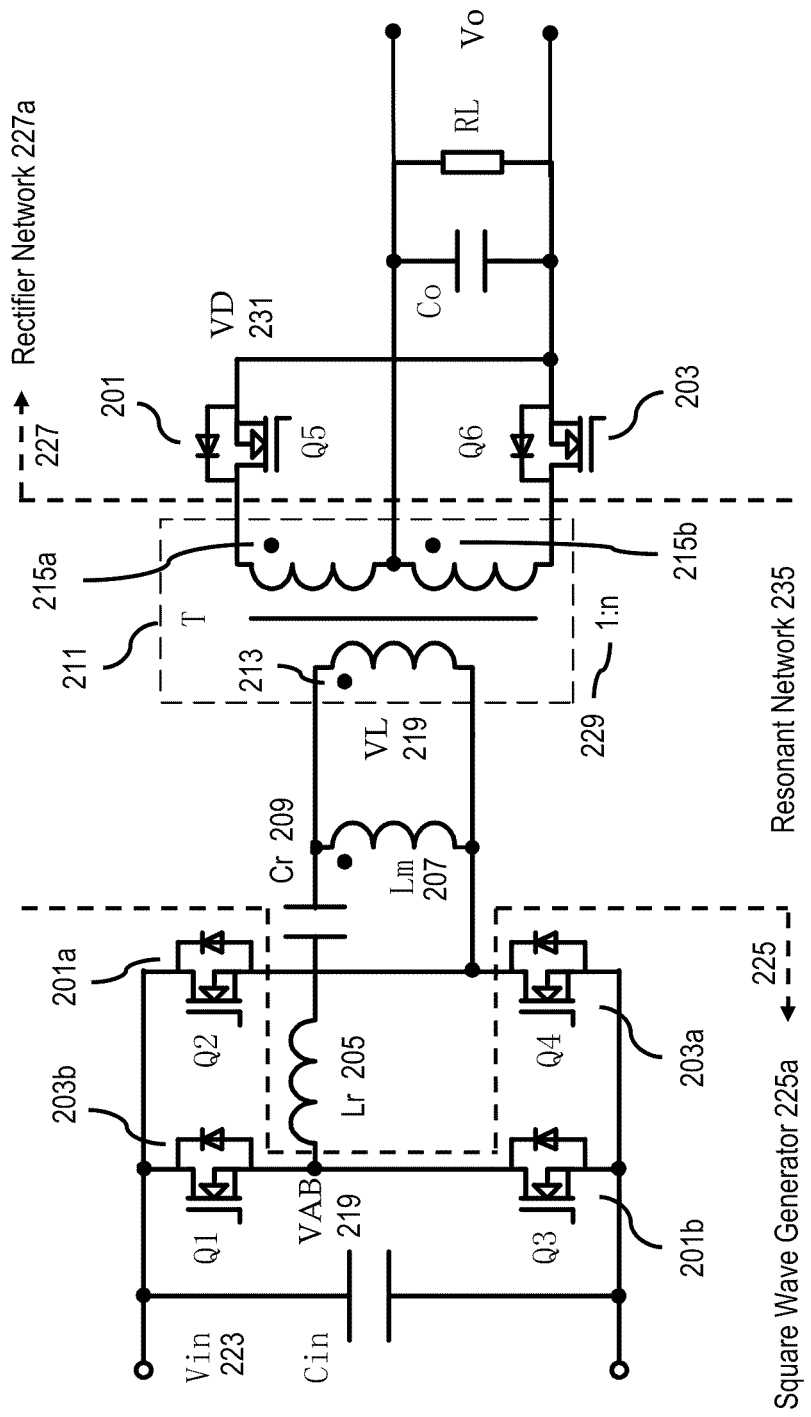
FIG. 2 is a circuit diagram depicting a LLC series resonant converter with DC gain controlled by a switching frequency, in accordance with an exemplary embodiment.

FIG. 2 is a circuit diagram depicting a LLC series resonant converter with DC gain controlled by a switching frequency, in accordance with an exemplary embodiment. While various implementations of resonant converters are available, their operation is essentially the same and is summarized as follows. A square pulse/wave of voltage $V_{AB}$ is generated by actively driving switching elements 201a-b or 203a-b in response to an applied voltage Vin (e.g., steady-state AC or DC). The square wave voltage $V_{AB}$ is then applied to a resonant circuit, which in this example is an LLC resonant tank circuit encompassing various inductors and capacitors connected in series. Energy is then circulated in the resonant circuit and some or all of it is tapped off to supply an output voltage, i.e., a load voltage $V_L$ 219 presented at a primary winding of a transformer T 211, which has a turns ratio of 1:n.

By way of example, the leftmost side of the circuit 101 as represented by the elements to the left of dashed line 225 comprises a square wave voltage generator 225a. The square wave generator 225a includes primary switching elements 201a-b and 203a-b for generating a square wave input $V_{AB}$ to the LLC resonant circuit network 235. This square wave is provided regardless of the supply voltage Vin, whether AC, DC etc. The rightmost side of the circuit 101, as represented by the elements to the right of the dashed line 227 (the transformer load), comprises a rectifier network 227a. The rectifier network 227a generates a DC voltage output $V_O$ by rectifying the AC current produced at the secondary windings of the transformer T 211. In addition, the rectifier network 227a includes synchronous rectifiers 201 and 203. This is performed through use of a full bridge and/or full-wave resonant circuit implementation, although other implementations may also be used.

By way of example, activation of switching elements 201a-b through use of full bridge/full-wave implementation is considered. In accord with this implementation, the top half of the secondary transformer winding 215a conducts during a positive half-cycle of supply voltage VD 231 input, delivering positive a half-cycle to the load. This condition triggers activation of SR 201 by secondary driver 105 to permit current draw through the top half winding and activation of corresponding switches 201a-b. Similarly, during negative input half-cycle, the bottom half of the secondary winding 215b conducts, delivering a positive half-cycle to the load and thus requiring activation of SR 203 to permit current draw through the winding and activation of corresponding switching elements 203a-b.

In one embodiment, the rectifier network 227a also includes a smoothing capacitor Co placed at the DC output of the rectifier for producing a steady DC output voltage relative to the rectified AC input. The smoothing capacitor Co effectively allows limiting the occurrence of ripple-like waveforms in the DC output. It is noted that even with smoothing capacitor, however, an amount of voltage ripple remains such that the voltage is never completely smoothed. Also coupled to the load is a load resistance $R_L$.

The resonant tank circuit of the resonant network 235 is so named for the three components that comprise the LLC circuit, namely a resonant capacitor Cr 209 which is connected in series with a resonant inductor Lr 205. In addition, the LLC circuit comprises a magnetizing load inductance Lm 207 of the transformer for impacting the resonance operation. The resonant circuit is then connected to the primary winding 213 of the transformer 211, while the secondary windings of the transformer 215a and 215b are connected to synchronous rectifiers (SRs) 201 and 203. Generally, the resonant network of the converter 101 filters the higher harmonic currents. Thus, only sinusoidal current is allowed to flow through the resonant network 235 even though a square wave voltage ($V_{AB}$) is applied to the resonant network.

In the one embodiment, the resonant converter circuit 101, comprising the square wave generator 225a and its complementary primary switching elements 201a-b and 203a-b, the resonant network 235 and its various inductors and capacitors, and the rectifier network 227a with its various SRs 201 and 203 and smoothing and load elements, may be implemented for enabling AC/DC, DC/DC power conversion etc. However, the circuitry 101 may also be implemented for enabling DC/AC conversion, DC/DC conversion or high frequency power conversion, with basic supporting design modifications where appropriate to condition the voltage gain (nVo/Vin). In addition, the resonant converter 101 may be implemented in accordance with other known converter circuit configurations and topologies, including but not limited to series and/or parallel configurations, LCC topologies and the like. It will be seen that the phase shift module 107 is suitable for any circuit configuration.

Figure 3:
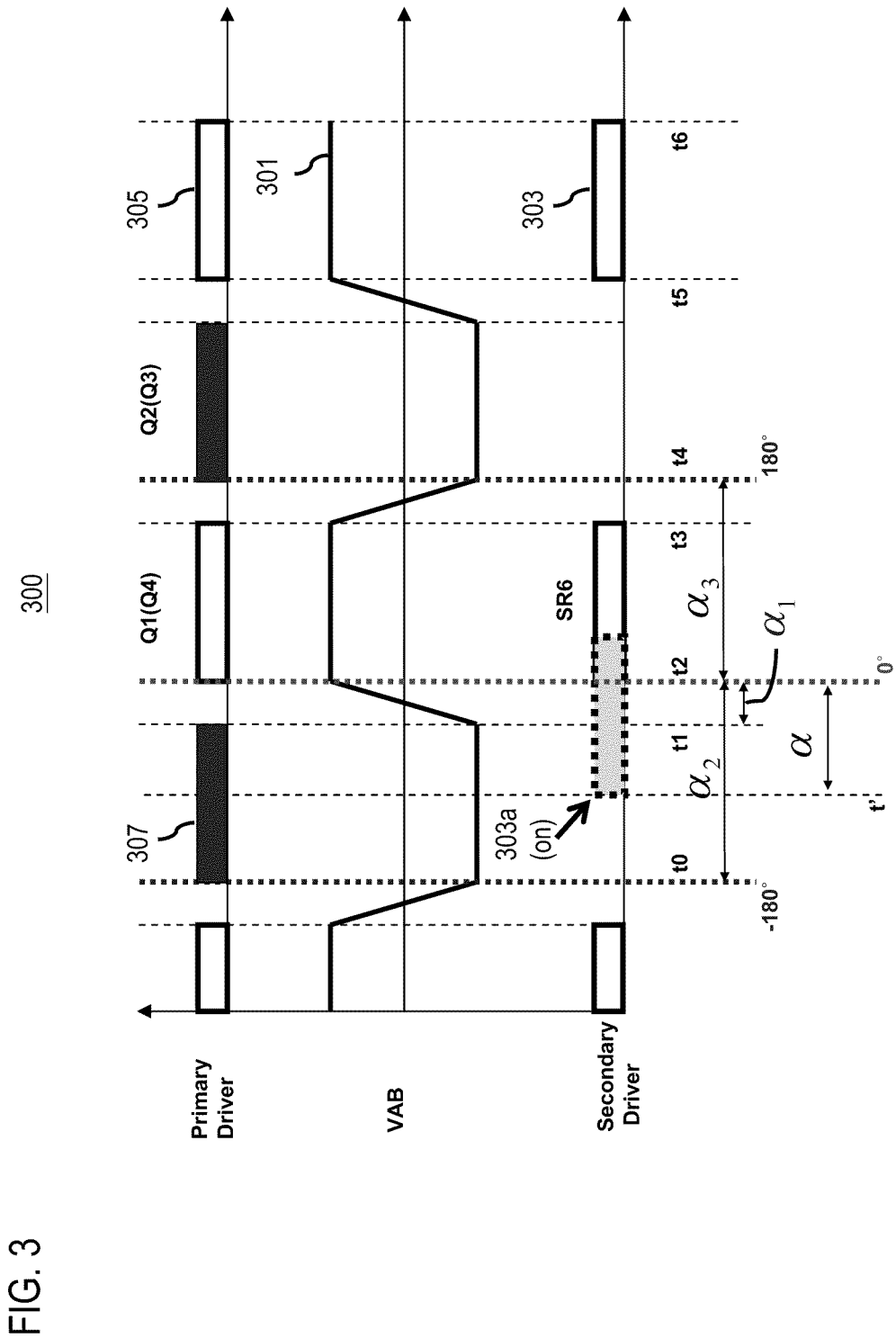
FIG. 3 is a timing diagram depicting a phase shift differential between a primary driver and a secondary driver of a resonant converter, in accordance with an exemplary embodiment.

FIG. 3 is a timing diagram depicting a phase shift differential between a primary driver and a secondary driver of a resonant converter, in accordance with an exemplary embodiment. By way of example, the timing diagram 300 pertains to an LLC resonant converter 101 as depicted in FIG. 2. The supply voltage $V_{AB}$ to the resonant network 235 of the converter 101 is supplied as a square wave input 301 of alternating frequency, transitioning from a positive to negative voltage recurrently. As mentioned, the primary driver 305, 307 provides timed, gate driven signals for generating the supply voltage $V_{AB}$ for driving switching elements 201a-b and 203a-b and the secondary driver 303 provides driven signals for SRs 203 (the signal for SR 201 is not shown in FIG. 3.). In typical operation, the secondary (SR) driver 303 and the corresponding primary driver 305 has no phase delay. Resultantly, the timing and application of SRs 201 and 203 are concurrent with the corresponding primary switches, enabling current to flow throughout the resonant converter circuitry 101 accordingly.

By way of example, both the primary driver signal 305 and SR driver signal 303 are driven to the ON state at approximately the same time t2, t5 etc., maintained for a period of time and then switched OFF at time t3, t6; corresponding also to the peak and declining voltage for the resonant circuit supply voltage $V_{AB}$ 301 as well. Consequently, this relationship indicates that SR Q6 203 of FIG. 2 is turned on at approximately the same time as corresponding primary switching elements 203a and 203b (Q1 and Q4) without regarding the propagation delay. Similarly, SR Q5 201 is turned on at approximately the same time as switching elements 201a and 201b (Q2 and Q3), corresponding to pulse 307 occurring at time t0 and t4. Hence, the typical lead in phase (degree) or time between the switching off of pulse 307 for switching elements 201a and 201b (Q2 and Q3) and the start of the primary driver pulse 305 for switches 203a and 203b (Q1 and Q4) is a represented by $\alpha_1$=(phase degree at time t1)–0° (the turning on of Q1 (Q4), phase degree at time t2). This period, wherein no switching activity occurs, is known as dead-time between the complementary switches of a bridge e.g. Q1 (Q4) and Q3 (Q2). And $\alpha_1$ is named as a dead-time degree. Also, the typical phase difference, as measured in degree or time, between the primary drivers of the complementary switching elements e.g. Q1 (Q4) and Q3 (Q2) is represented as phase shift $\alpha_2$=–180°=(phase degree at time t0)–(phase degree at time t2), $\alpha_3$=180°=(phase degree at time t4)–(phase degree at time t2).

When the secondary driver 105 signals are turned on earlier, such as to compensate for current leakage occurring in the diodes of the synchronous rectifiers prior to them being activated (power loss), a new phase shift α is introduced. By way of example, this new phase shift represents: the difference in degree or time between the turning ON of the secondary driver pulse 303 for SR 203, represented by pulse 303a which is shown to start earlier at time t' rather than t2; and the corresponding primary driver pulse 305 for switching elements 203a-203b. This relationship is expressed as α=(phase degree at time t')–0° (phase degree at time t2). Because the LLC resonant converter 101 is a full bridge/full-wave series resonant converter, the DC gain (nVo/Vin) is generally controlled by switching frequency. But, the phase shift can also be used for DC gain regulation, and the extent to which the phase shift exceeds or is less than the dead time $\alpha_1$ also impacts the gain, as well as the physical integrity of the switching elements—i.e., lessened dead time imposes greater wear on switching elements as well as promotes increased power usage/loss. The range of the phase shift $\alpha$ (degree) is from −180 degrees (inclusive) to 180 degrees (inclusive); in one embodiment, the range varies from −180 degrees to 0 degree (inclusive) By way of example, the range varies from dead-time degree to 0 degree; and more specifically, the range varies from dead-time degree to diode-conducting degree. It is contemplated that the above stated ranges are inclusive of the endpoints. Furthermore, in other embodiments, the endpoints are approximate, but inclusive in nature, so long as the performance are equivalent.

FIGS. 4A-4D are graphs depicting a relationship between switching frequency and DC gain for different resonant converter implementations, according to various embodiments. It is noted that for typical resonant converter implementations (e.g., LLC resonant converter 101), it is difficult to lower the DC gain to zero as is desired for startup up smoothly from zero voltage requirement by merely increasing the switching frequency. By way of example, in FIG. 4A, a typical simulated DC gain curve response for both light and heavy loads is shown. The x-axis represents the normalized operational frequency of the circuitry, determined as a measure of the operating frequency versus the resonant frequency of the resonant tank circuit. The y-axis represents the DC gain level attained as the output voltage $V_O$ multiplies n (the turns ratio of the transformer T) versus the input voltage $V_{in}$. For light load operations, the DC gain curve 401 is typically higher than the curve 403 for heavy loads over the same frequency range. Gain for lighter loads is typically greater than a certain value e.g. 0.7 as shown in FIG. 4, even as the switching frequency increases. Driving the frequency further higher results in no net DC gain decrease, but rather, introduces increased excitation of the components of the circuit that can lead to them being damaged (e.g., frying, burning out, etc.).

Figure 4A:
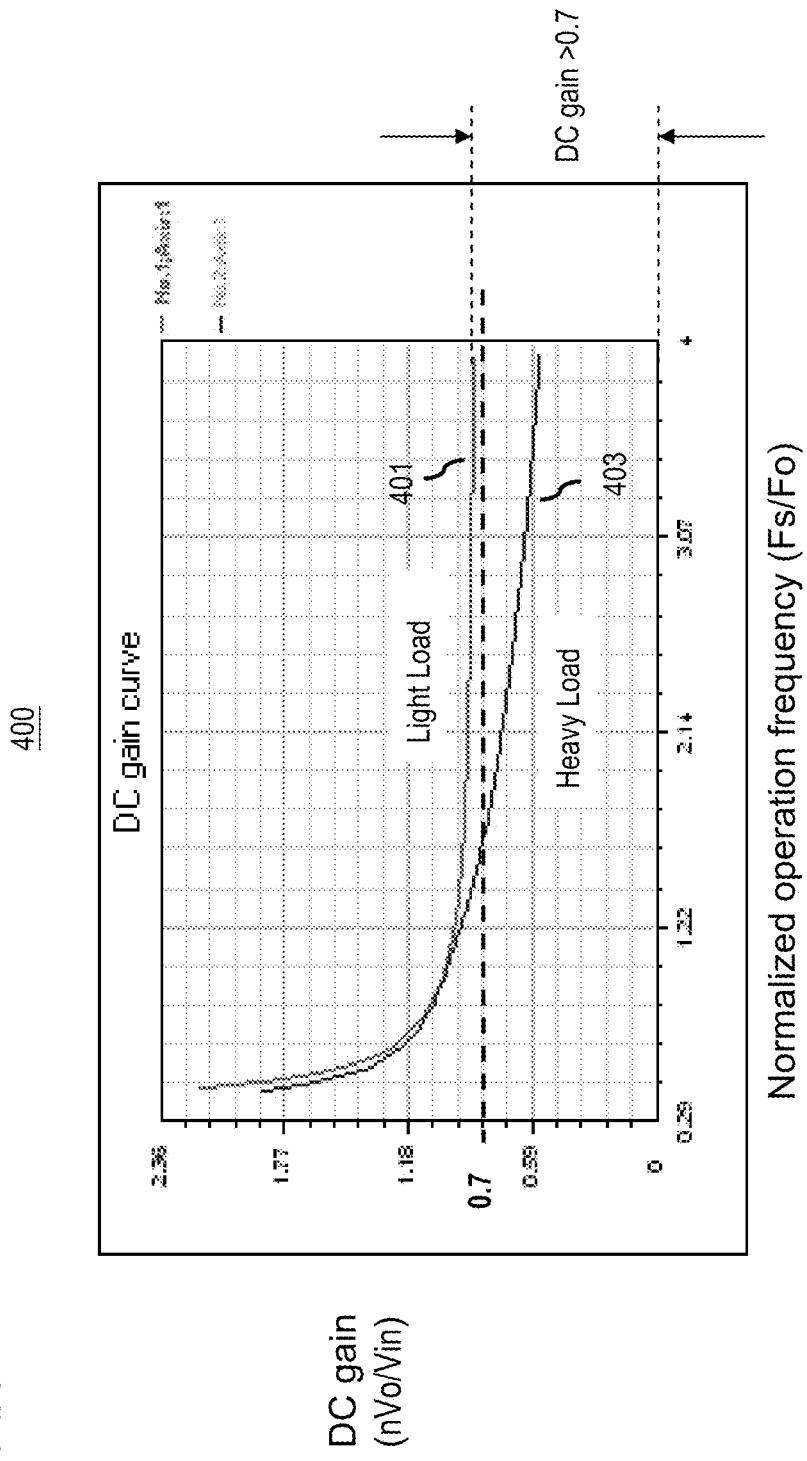
FIGS. 4A-4D are graphs depicting a relationship between switching frequency and DC gain for different resonant converter implementations, according to various embodiments.
Figure 4B:
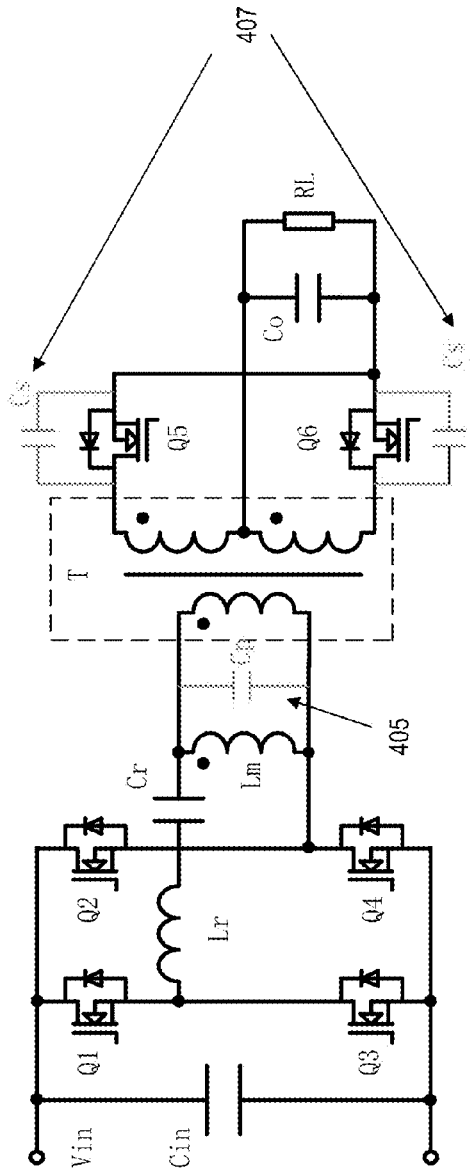

FIG. 4B is a circuit diagram depicting a resonant converter with one or more parasitic capacitors, in accordance with an exemplary embodiment. In this example, parasitic capacitors $C_P$ and $C_S$ are introduced into the resonant network 235 and the rectifier network 227a circuitry of the resonant converter to reflect real world parasitic conditions. Typically, electrical components possess some form of parasitic or unwanted characteristics inherent in their very design, particularly in the form of unwanted capacitance, inductance or resistance within the element. This may include the presence of capacitance within a resistor or a detected capacitive charge created by the windings of a transformer. To address this issue, with respect for example to an unwanted capacitive charge, one or more capacitive elements CP 405 and 407 may be added to the converter 101 for draining or storing the capacitive energy.

Unfortunately, under light load operation the capacitors result in a charge pump effect that increases the DC gain. This is illustrated by way of example with respect to FIG. 4C, which depicts a simulated DC gain curve for both light and heavy loads relative to the addition of capacitive elements within the resonant converter, in accordance with an exemplary embodiment. The resulting charge pump effect, shown in this example as curve 409, is due to the capacitors 405 and 407 sending more energy to the output side of the resonant converter 101, which in turn causes the output voltage to rise. This phenomenon is discussed in greater detail with respect to commonly assigned U.S. Pat. No. 7,733,669 to Jioa et al., which is incorporated by reference herein in its entirety.

Figure 4C:
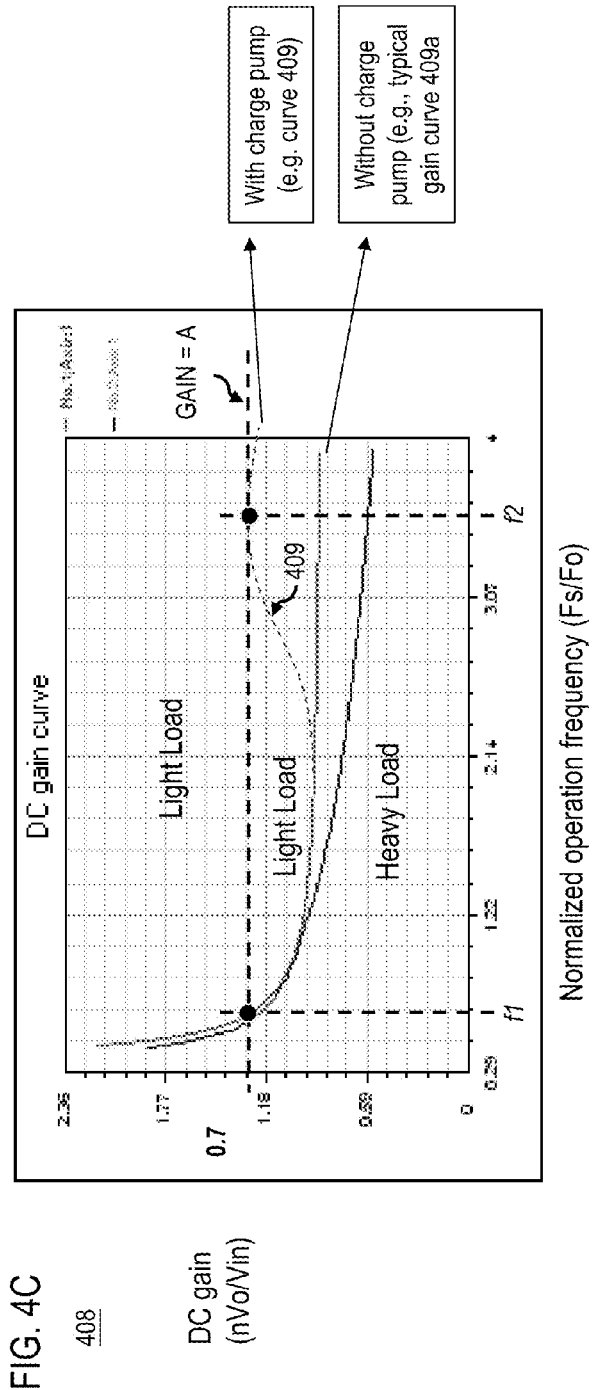

It is noted the phenomenon presented with respect to FIG. 4C, where the charge pump offsets the typical output voltage and hence DC gain curve 409a, shows a gain level (e.g., GAIN=A) corresponding to multiple operating frequencies (e.g., frequencies f1 and f2). This is as opposed to a desired monotonic characteristic, where the DC gain curve for light load conditions ramps down effectively to zero with ever increasing operating frequency. Under the latter scenario, the optimal control voltage gain within a resonant converter is achieved. This is illustrated with respect to FIG. 4D. Contrastingly, for the former scenario presented with respect to FIGS. 4B and 4C, there is no optimal operating frequency for achieving a desired gain effect. GAIN A corresponds to frequencies f1 and f2, resulting in a non-steady, unpredictable gain characteristic which may make the converter unstable and endures a high power loss.

Figure 4D:
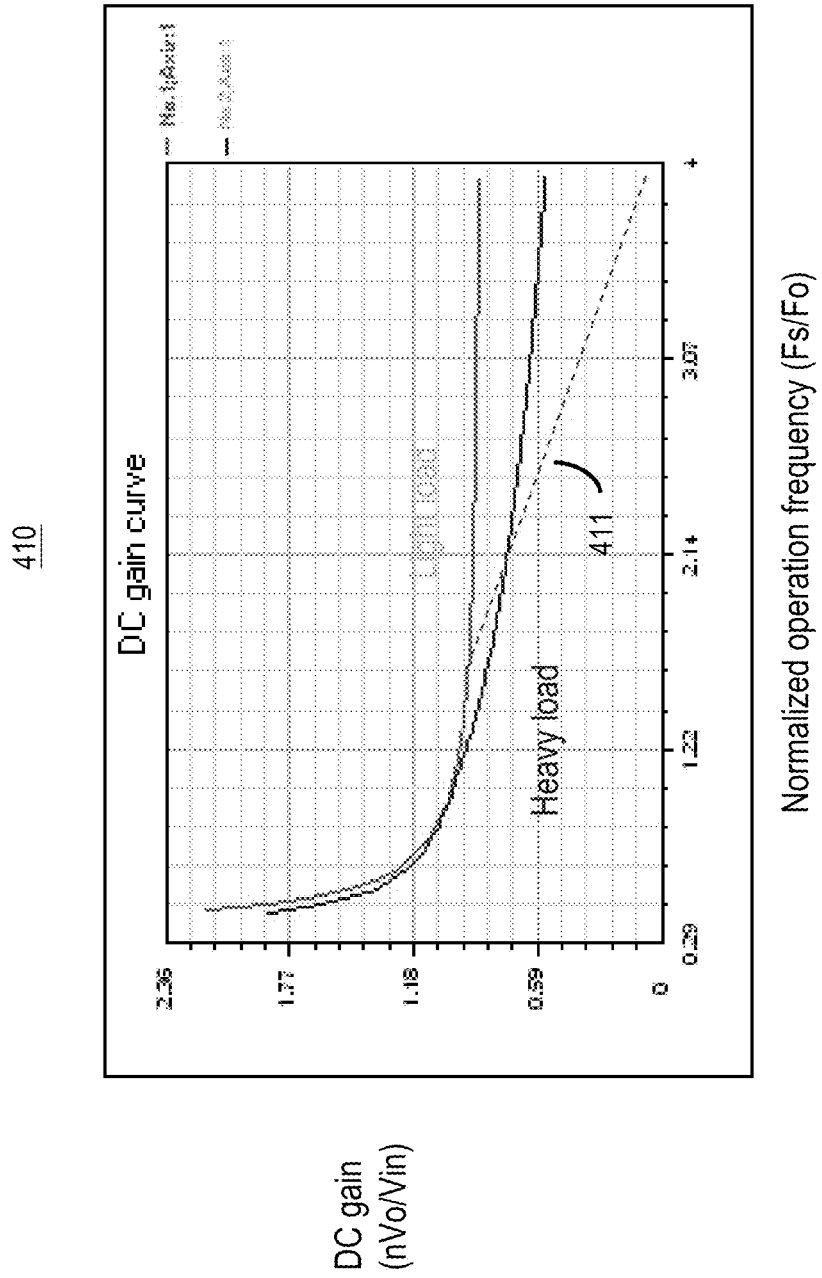

FIG. 4D shows the simulated DC gain curve as achieved through a means of compensating for parasitic capacitance in accordance with an exemplary embodiment. By way of example, the desired monotonic DC gain characteristic is shown with respect to curve 411. Under this scenario, the DC gain at light load operation gradually ramps down to zero with increased operating frequency. This is unlike the gain curve with charge pump 409 that is prone to different operating frequencies. It is noted that the DC gain response curve 409 results from output load voltage Vo not rising up slowly and smoothly from zero (e.g., in a linear fashion) to a predetermined voltage level due to the introduction of the additional capacitance (e.g., charge pump). Hence, a means of managing the inherent charge pump effect within the resonant converter is required.

Figure 4E:
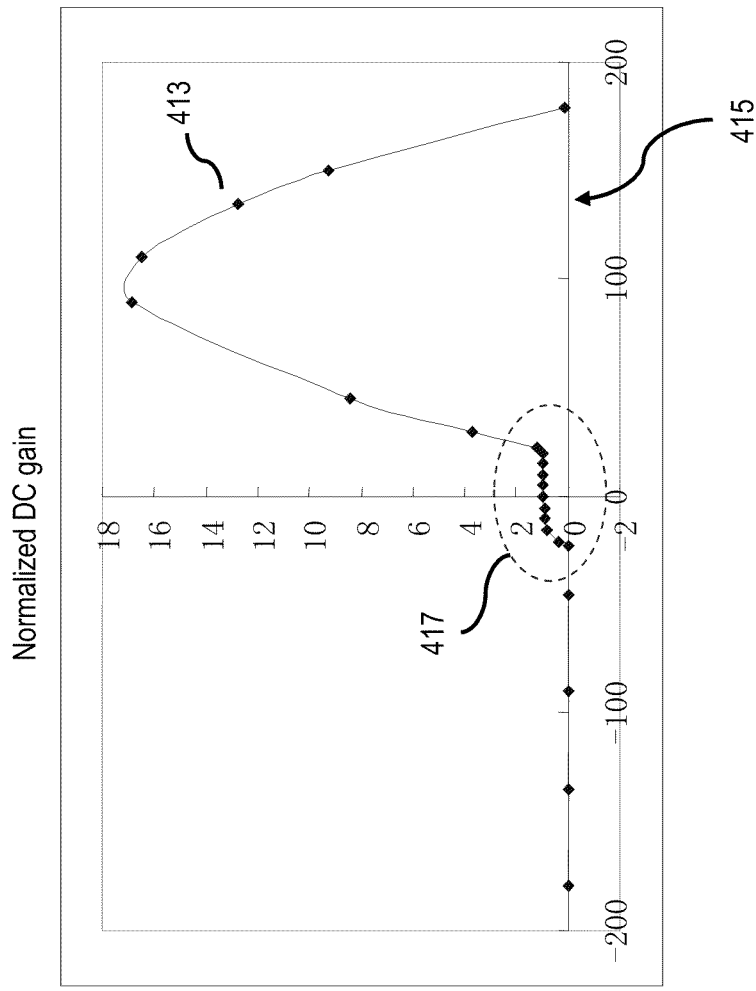
FIGS. 4E and 4F are diagrams depicting a relationship between a phase shift and a voltage gain of a resonant converter, according to various embodiments.
Figure 4F:
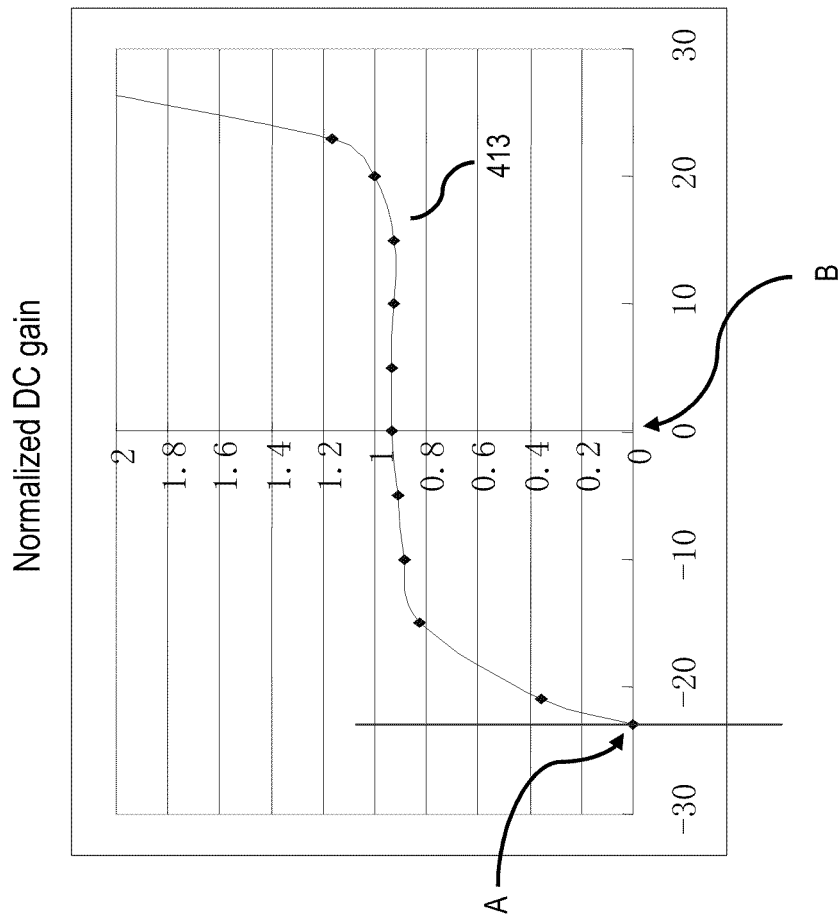

To achieve the various effects described above, a phase shift module 107 as configured with respect to the resonant converter 101 as in FIG. 1, enables the DC gain to decrease for higher frequency switching applications of the resonant converter 101. The implementation of the phase module 107 and its applications are presented further with respect to the circuit diagram 500 of FIG. 5A. For illustrative purposes, however, FIGS. 4E and 4F are diagrams depicting a relationship between a phase shift and a voltage gain of a resonant converter, according to various embodiments. In FIG. 4E, a normalized DC gain response curve 413 is shown as it varies over different phase degree values as plotted along an x-axis 415. A zoomed-in section 417 the gain curve 413 is shown in FIG. 4F for a limited phase degree range of −30 degrees to +30 degrees. The DC gain curve 413 is maintained at zero until it reaches a phase degree value corresponding to point A, which also corresponds to a dead-time of the primary driver for the complementary switches in a switch bridge. It then rises monotonically beyond zero as the phase increases beyond point A. Hence, the DC gain could be lowered down to zero if the phase degree represented by a point B were shifted to point A. This effect corresponds to the shifting of the phase degree of the SR driver before that of the corresponding primary driver to a degree 0 minus the phase degree at point A.

Figure 5A:
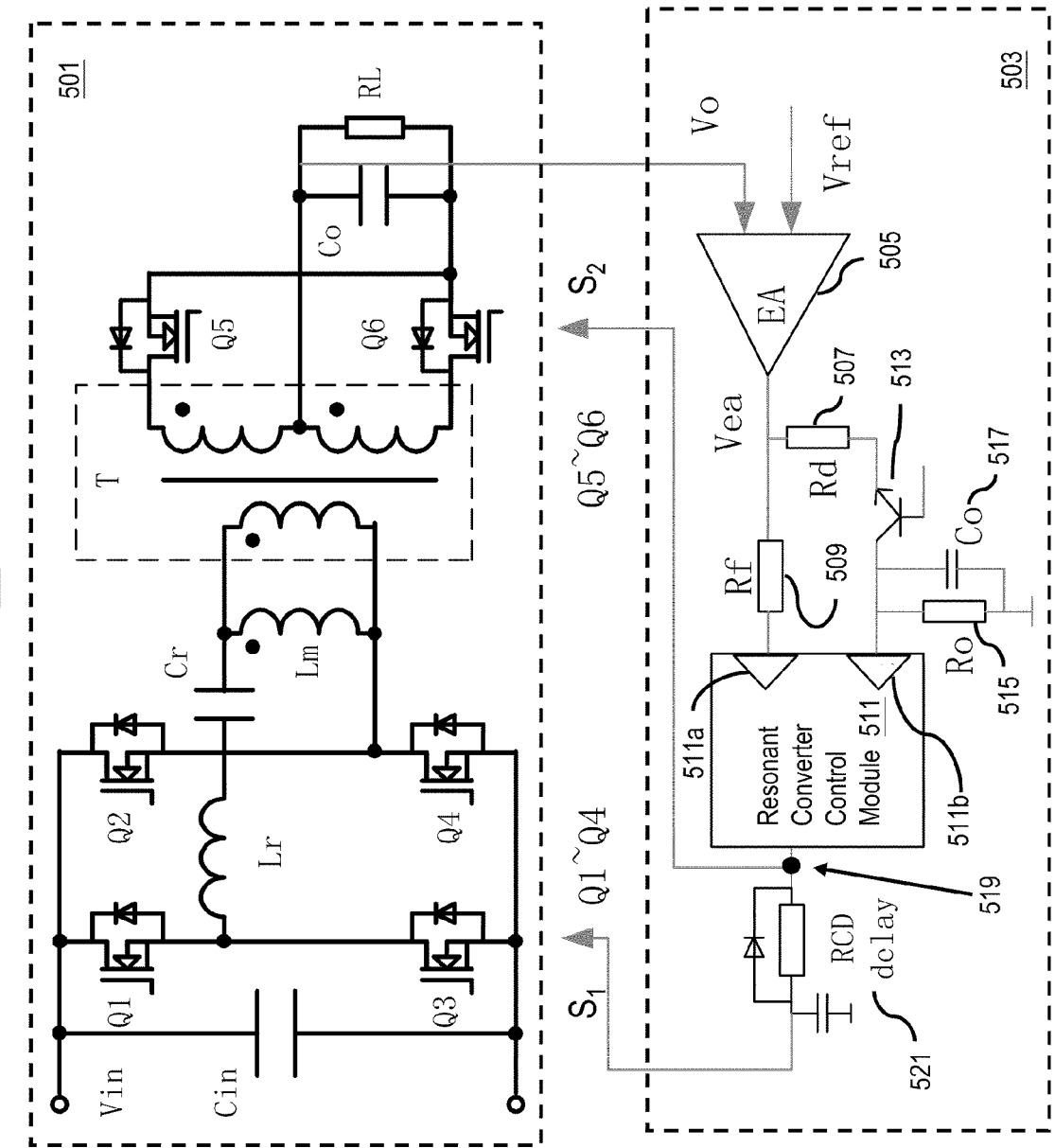
FIG. 5A is a circuit diagram depicting a resonant converter configured with a phase shift module for regulating a direct current gain, in accordance with an exemplary embodiment.

FIG. 5A is a circuit diagram depicting a resonant converter configured with a phase shift module for regulating a direct current gain, in accordance with an exemplary embodiment. By way of example, the phase shift module 503 of the applied circuit 500 receives as input the output voltage Vo of the resonant converter 501. This enables the phase shift module 503 to operate as a unidirectional feedback circuit within the overall applied circuit 500/100; the operation of the phase shift module being based, at least in part, on the feedback it receives from the resonant converter in the form of voltage data. This input $V_O$ is fed to an error amplifier EA 505 of the phase shift module, which then receives the sampled output voltage of the circuit and compares this to a stable reference voltage (e.g., a voltage corresponding to the desired voltage gain). Any difference between the two signals of the error amplifier 505 results in the generation of a compensating error voltage Vea, which corresponds more closely to the desired output voltage.

In the one embodiment, the compensating error voltage Vea is fed as input to a resonant converter control module 511. The resonant converter control module 511 may be implemented as a high performance ZVS controller, designed for off-line, AC/DC or DC/DC converter applications that utilize frequency modulated constant off-time or constant dead-time control. Various implementations of such control modules are well known in the industry for use within the phase shift module 503. Depending on design specifications, the applied compensating error voltage Vea can be provided as input to a frequency regulation control 511a of the controller 511, for regulating the switching frequency. A resistor Rf 509 can be applied for dampening the frequency response accordingly. Vea can also be fed to a dead-time control input 511b of the control module 511 for enabling the regulation (modification) of dead-time switching characteristics. As the frequency response and dead-time response are related, resistor Rd 507 and switching element 513 may be provided, for enabling variable control of either frequency switching or dead-time control by the resonant converter control module 511. A load impedance Ro 515 and smoothing capacitor 517 may also be provided for generating a more fluent, ripple free input 511b to the controller 511.

In the one embodiment, the control module 511 accounts for both the dead-time response and frequency response characteristics of the resonant converter 503, as discussed with respect to FIGS. 3 and 4A-4F, by conditioning the voltage output Vea of the error amplifier; Vea being based on the provided output voltage of the resonant converter 501. In this way, a compensatory output signal 519 is generated by the resonant converter control module 511, the signal being suitable for generating the secondary driver signal S2 of the resonant converter 501. As an additional conditioning element of the phase shift module 503, a delay circuit 521 forming by e.g. resistor-capacitor-diode (RCD) generates a predetermined amount of activation delay time (e.g., expressed in nanoseconds) between the secondary driver signal $S_2$ and the primary driver signal $S_1$. This delay, referred to resonant circuit delay may further account for phase delay α. As shown, signals $S_1$ and $S_2$ are then fed back to the primary 103 and secondary driver 105 of the resonant converter, respectively. By way of this configuration, the switching elements and SRs of the resonant converter 503 are driven/triggered based on active and persistent DC gain monitoring, feedback and regulation.

Figure 5B:
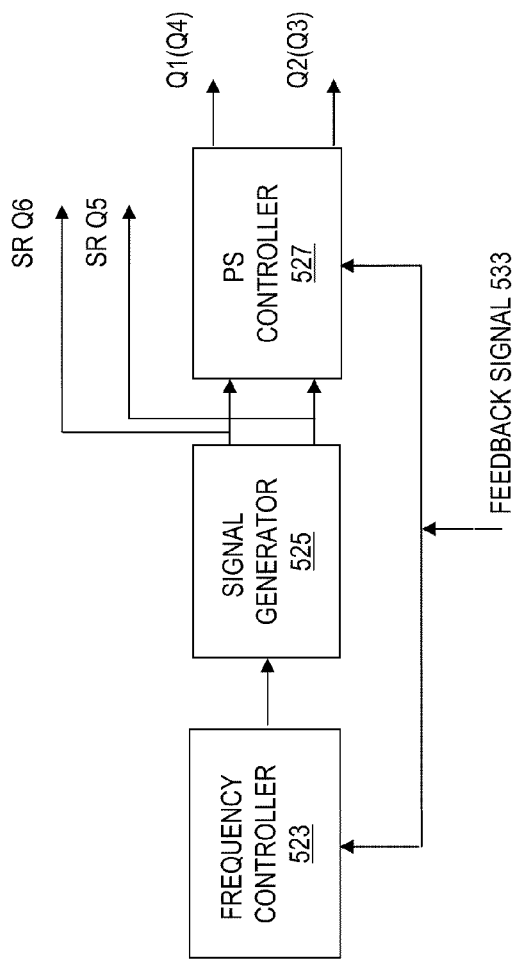
FIGS. 5B and 5C depict the frequency control, dead-time regulation control and phase shift control capabilities of a phase shift module implemented as separate control modules, according to various embodiments.
Figure 5C:
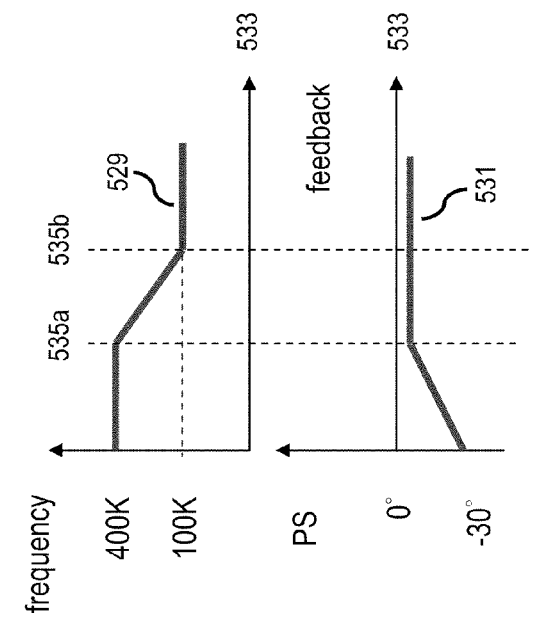

FIGS. 5B and 5C depict the frequency control, dead-time regulation control and phase shift control capabilities of the phase shift module implemented as separate control modules, according to various embodiments. By way of example, FIG. 5B presents a standalone phase shift controller 527 that provides output signals for primary switching elements Q1 and Q4 and switching elements Q2 and Q3 of the resonant converter 101. In addition, a standalone frequency controller 523 provides output signals for regulating frequency of the resonant converter 101. The independent controllers 523 and 527 are interconnected by way of a signal generator 525. In this configuration, the signal generator 525 receives the output signal from the frequency controller 523 and provides drive signals for SRs Q6 and Q5 of the resonant converter 101. Hence, the signal generator 525 produces respective signals $S_1$ and $S_2$ for influencing the primary and secondary driver of the resonant converter 101 accordingly. Also, the feedback output voltage Vo at the rectifier network 227a of the resonant converter circuit 101 is provided to controllers 523 and 527, where each controller performs its respective function based on the input.

FIG. 5C depicts graphs representative of the frequency and phase shift response resulting from the implementation of the frequency control and phase shift control as separate modules, in accordance with an exemplary embodiment. By way of example, the frequency response curve 529 and phase shift curve 531 varies in response to the voltage feedback signal, represented along the x-axis 533 of respective graphs. As the feedback voltage signal increases the frequency response curve 529 ramps down between a voltage range from 535a to 535b from a high frequency (e.g., 400 k) to a lower one (e.g., 100 k). Concurrent with this response, the phase shift curve 531 initially ramps up, but then remains constant for the same voltage range 535a to 535b and thereafter. It is noted that independent control of the frequency and phase shift response produces the same response as phase shift module 503 of FIG. 5A.

Figure 5D:
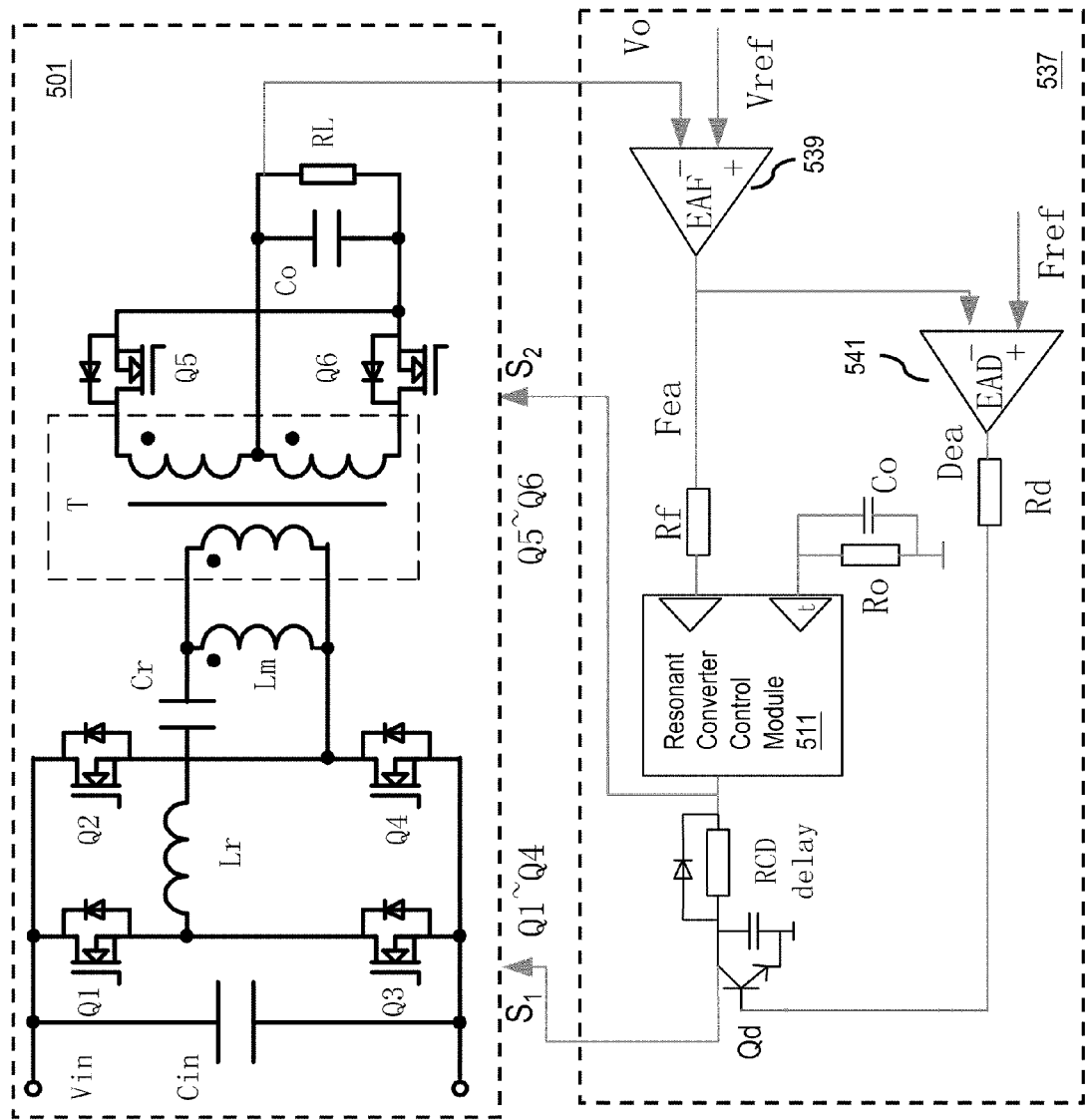
FIG. 5D is a circuit diagram depicting a resonant converter configured with a phase shift module for regulating a direct current gain, in accordance with an exemplary embodiment.

Various other configurations for implementing the applied circuit 500, including using additional error amplifiers to attune the output voltage, are within the scope of the exemplary embodiments presented herein. By way of example, FIG. 5D is a circuit diagram depicting a resonant converter configured with a phase shift module featuring various error amplifiers for regulating a direct current gain, in accordance with an exemplary embodiment. This configuration corresponds to the approach presented with respect to FIGS. 5B and 5C, where the frequency response and phase shift are implemented as separate controllers for achieving the same DC gain regulation effect of the applied circuit. In this example, applied circuit 538 features a phase shift module 537 that is configured to a resonant converter 501 for receiving a feedback signal Vo. The output voltage signal (Vo) in turn serves as input along with an applied reference voltage Vref to an error amplifier EAF 539 of the phase shift module 537, where EAF 539 acts to regulate the frequency response of the applied circuit 535. The output of EAF 539, labeled herein as signal Fea, is fed to a resistor RF and eventually supplied as input to a resonant converter control module 511; as done with respect to the applied circuit 500. The output signal Fea is also provided to amplifier circuit EAD 541, a frequency feedback amplifier for regulating the delay time. Output signal Dea of amplifier EAD 541 is then coupled to a switch Qd for providing a regulated/timed phase shift delay response signals Si and S2 accordingly. It is noted with respect to the applied circuit 538 that when the frequency is regulated and less than 400 k, output signal Fea is greater than reference voltage Fref and amplifier EAD 541 is negatively saturated. Resultantly, the delay time, and hence phase differential provided to the resonant converter 501 in the form of signals $S_1$ and $S_2$ is minimized.

It is further noted, however, that the configuration of the applied circuit may enable even lower voltage gain signal control. By way of example, when the output signal Fea of amplifier EAF 539 is pulled lower than the reference voltage Fref, amplifier EAD 541 no longer operates within a saturation state. Resultantly, synchronous rectifier Qd draws current from the resonant converter control module 511 and it generates more delay time—i.e., more phase shift differential. From this interaction, it is seen that the output signal Fea can be stabilized at the reference voltage Fref when required to modulate or affect DC gain.

Figure 5E:
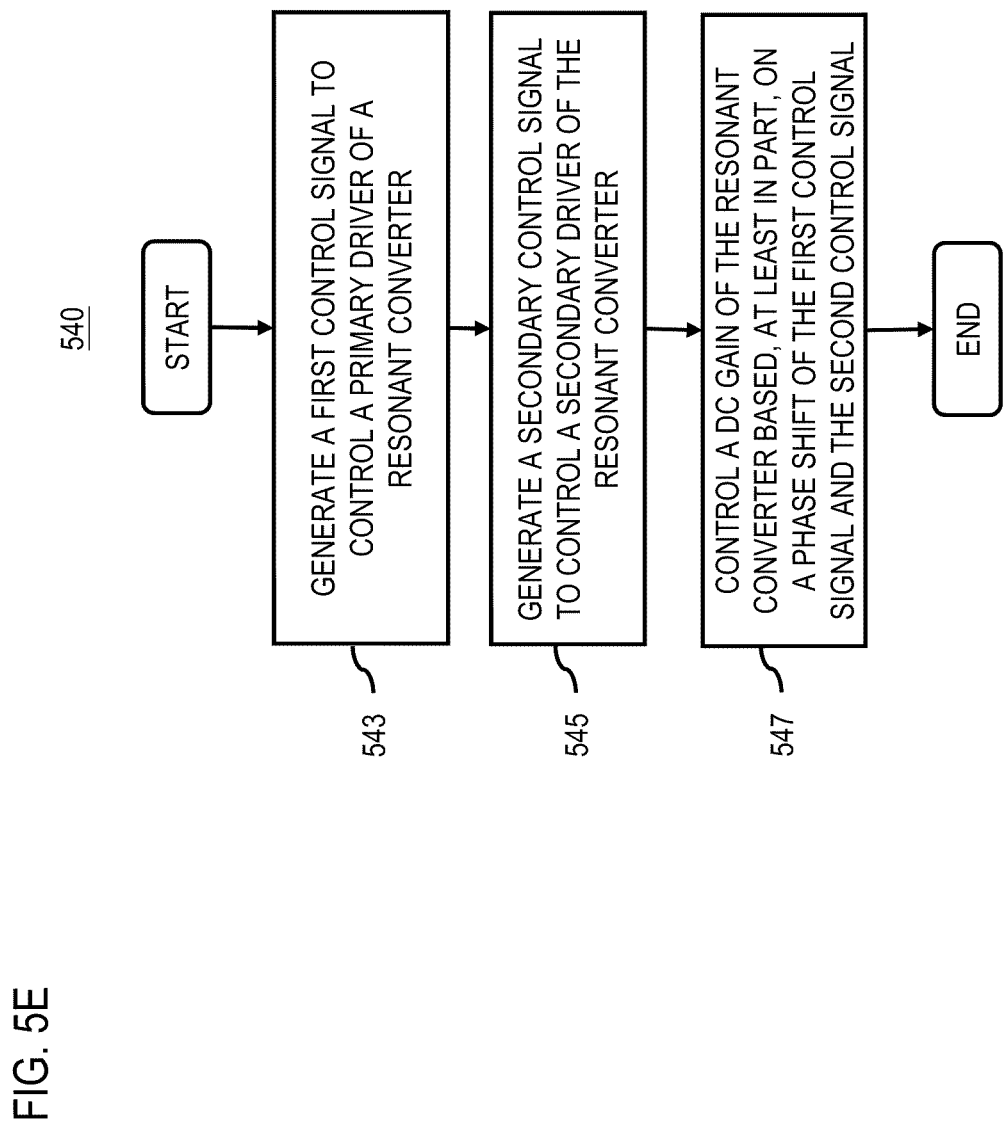
FIG. 5E is a flowchart of a process for regulating a direct current gain within a resonant converter, in accordance with an exemplary embodiment.

FIG. 5E is a flowchart of a process for regulating a direct current gain within a resonant converter, in accordance with an exemplary embodiment. This process 540 for enabling gain regulation, frequency regulation and dead time control, by way of example, can be performed by the circuit 500 of FIG. 5A or circuit 538 of FIG. 5D. In step 543 of process 540 involves the phase shift module 503 generating a first control signal $S_1$ to control a primary driver of the resonant converter 501. In step 545, the phase shift module 503 generates a secondary control signal $S_2$ to control a secondary driver of the resonant converter 501. The phase shift module 503, as in step 547, operates in connection with the resonant converter 501 within a feedback configuration (applied circuit 500 and 538) to control a DC gain of the resonant converter. The control capability is based, at least in part, on a phase shift of the first control signal and the secondary control signal. This shift, or differential, is a means of compensating for a gain condition and/or the other various characteristics that impact the desired gain.

FIGS. 6A-6E are timing diagrams depicting the behavior of the resonant converter over time in response to a phase shift differential between a primary and secondary driver that is in excess of a calculated dead-time between the drivers, according to various embodiments. By way of example, each diagram shows the movement of current through the resonant converter circuit at a given time interval in the topmost diagram; then the corresponding phase shift differential occurring between the primary and secondary driver of the resonant converter for a given time interval in the bottom most diagram of each figure. In particular, the current flow through the circuit is shown as it occurs on the primary and secondary sides of the transformer T. Furthermore, diagrams 6A-6E assume that the phase differential or delay as determined α is greater than the calculated dead-time a1, thus presenting the circuit response accordingly.

Figure 6A:
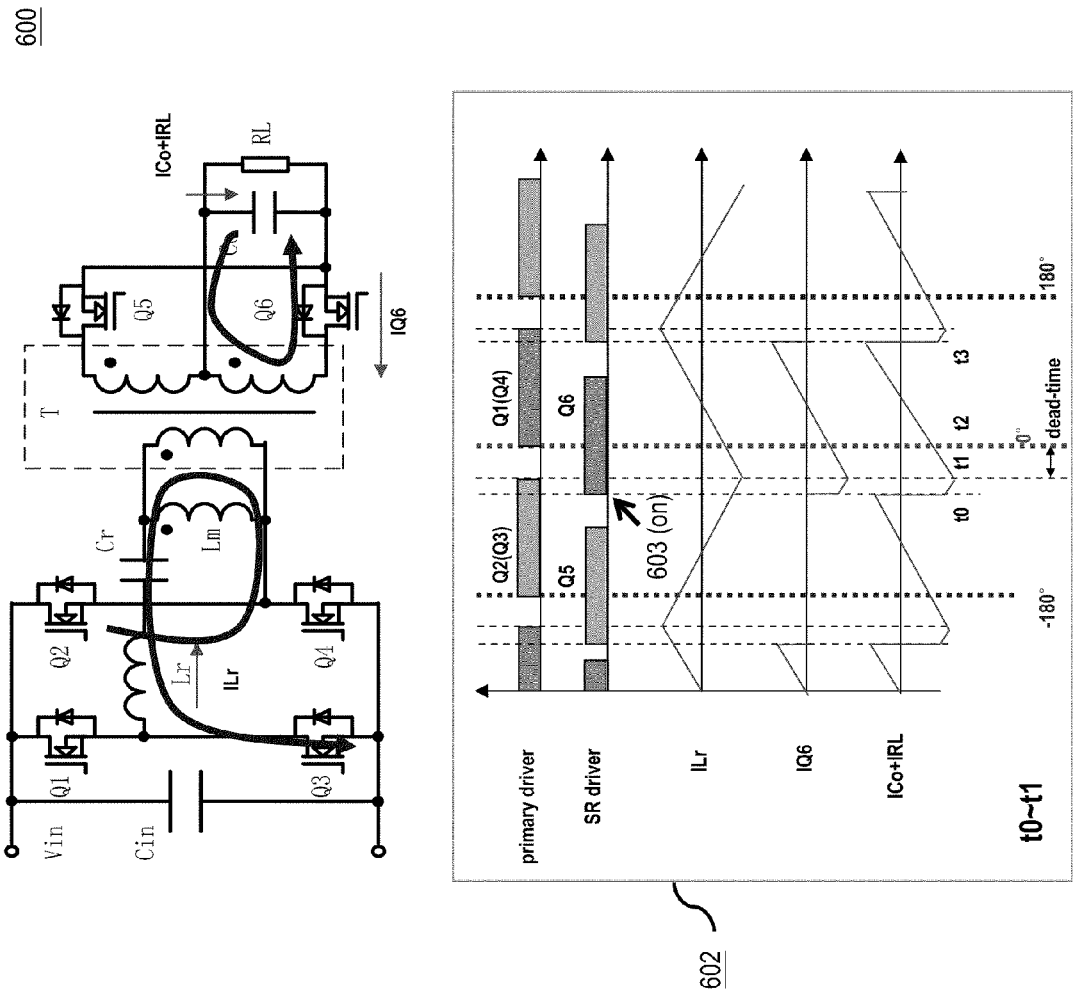
FIGS. 6A-6E are timing diagrams depicting the behavior of the resonant converter over time in response to compensating for a phase shift differential between a primary and secondary driver that is in excess of a calculated dead-time between the drivers, according to various embodiments.

FIG. 6A depicts the following:
During time t0 to t1:
1. After SR Q6 is turned ON 603 by the secondary driver of circuit 600, as represented in 602, Q6 is forced to conduct current as shown in 600.
2. Due to the flow of current ILr from switching elements Q2 and through the resonant network tank circuit to Q3, the current IQ6 of SR Q6 has to be from drain to source, resulting in a discharge of current ICo through capacitor Co, as represented in 602.

Figure 6B:
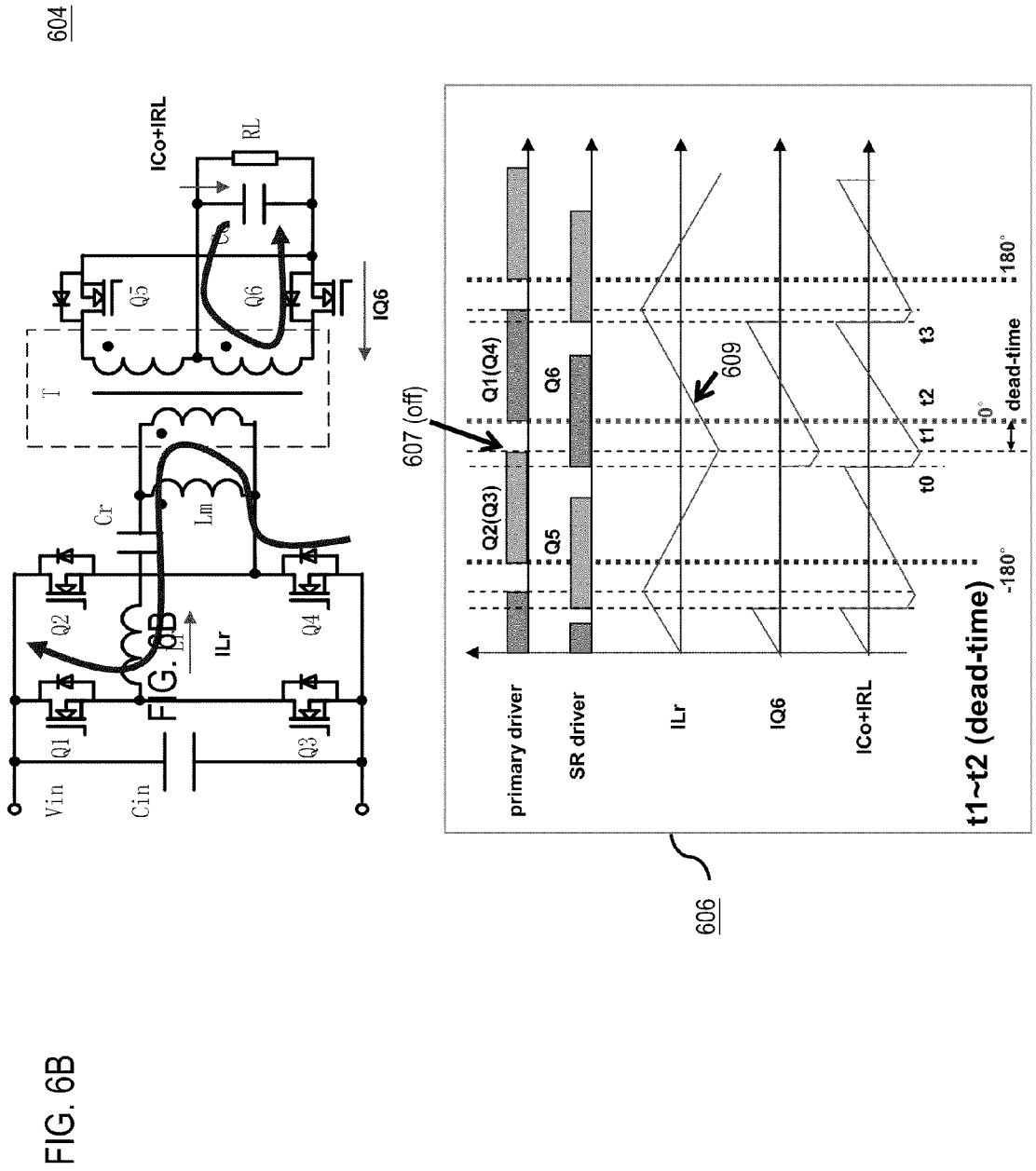

FIG. 6B depicts the following:
During time t1 to t2:
1. After switching elements Q2 and Q3 are turned OFF 607 through deactivation of the primary driver, as represented in 606, the current through the resonant inductor ILr has to flow through body diode of switching elements Q1 and Q4, as represented in 604. ILr begins to ramp-up 609 at this time.
2. Because the current through the inductor ILr has the same direction as t0~t1, IQ6 still flows from the drain side to source and discharges capacitor Co, as represented in 606.

Figure 6C:
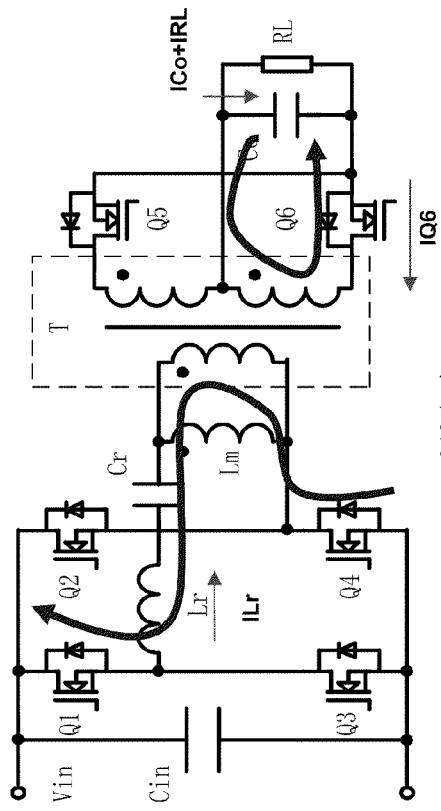
Figure 6C:
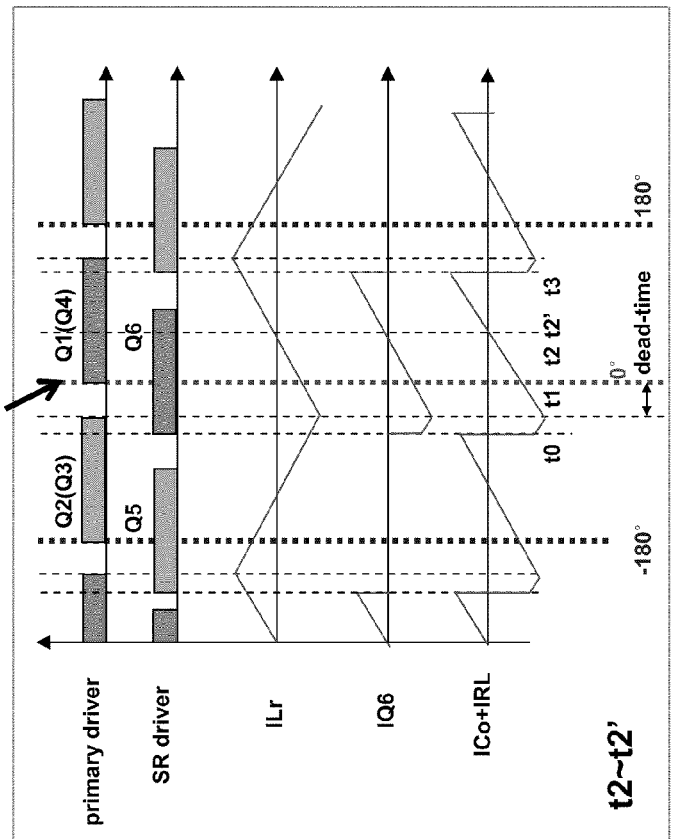

FIG. 6C depicts the following:
During time t2 to t2':
1. Switching elements Q1 and Q4 are now turned ON 613 as represented in 612, and the current through the resonant conductor ILr has to flow through them, as represented in 610.
2. As current ILr has not changed direction at this time, the current IQ6 flowing through SR Q6 still flows from drain side to source, and discharges the capacitor Co, as represented in 612.

Figure 6D:
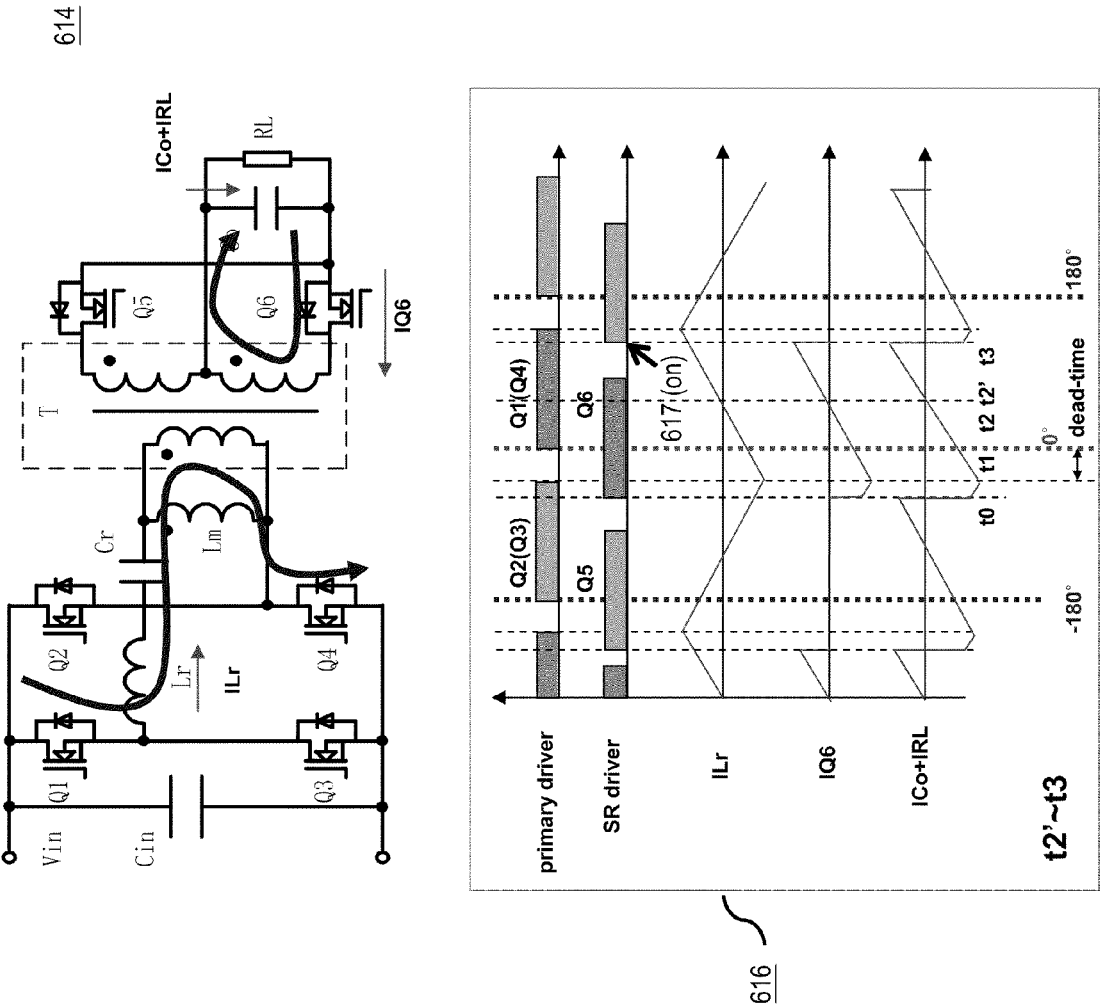

FIG. 6D depicts the following:
During t2' to t3:
1. The current through the resonant inductor ILr changes its direction of flow direction after t2' as represented in 610.
2. IQ6 now flows from source side to drain, and charges capacitor Co, as represented in 616.
3. After t3, SR Q5 turns ON as represented in 616; the operation process is the same as SR Q6.

Figure 6E:
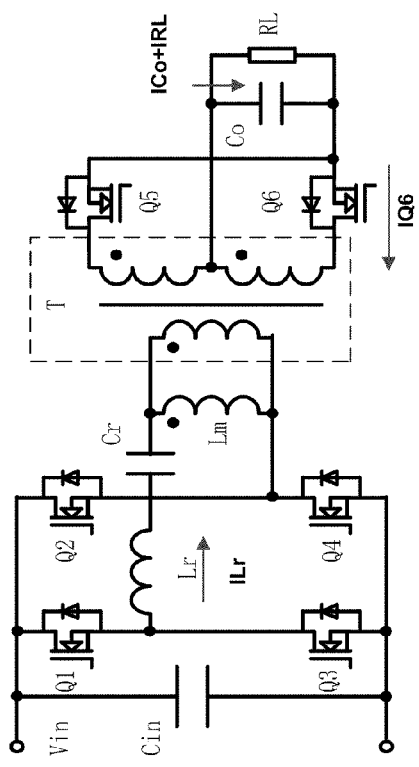
Figure 6E:
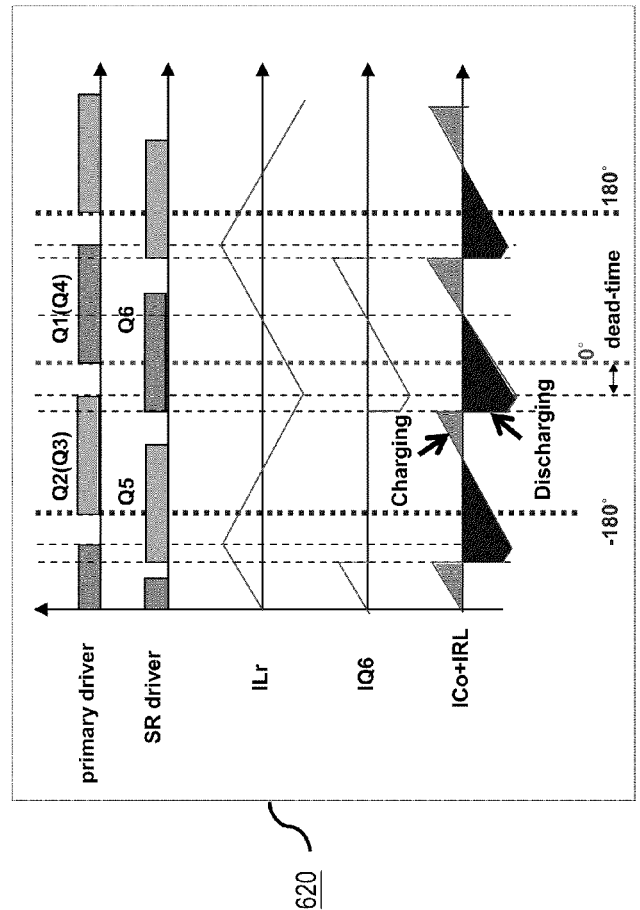

FIG. 6E depicts a summary of FIGS. 6A-6D that presents the following:
For the duration of time t0 to t3:
1. The summation of current values through the capacitor and load resistance ICo+IRL equals the sum of current values IQ5 and IQ6 that flowed through SRs Q5 and Q6 respectively.
2. The current waveform produced from summation of ICo+IRL, as represented in 620, shows the charging current over time atop the x-axis of the waveform and discharging current below the x-axis.
3. The average discharging current is larger than charging current, as represented in 620. Therefore, a compensatory effect is attained for enabling the load voltage Vo to be discharged to zero as desired. It is noted that this approach for regulating the voltage gain of the resonant converter is responsive to a phase delay, dead-time and/or switching frequency as monitored, determined and regulated by a phase shift module 107.

FIGS. 7A-7E are timing diagrams depicting the behavior of the resonant converter over time in response to compensating for a phase shift differential between a primary and secondary driver having a calculated dead-time that is less than the phase shift between the drivers, according to various embodiments. The discussion proceeds in the same manner as presented with respect to FIGS. 6A-6E. However, by way of example, diagrams 7A-7E assume the calculated dead-time $α_1$ is less than the phase differential or delay α as determined. It is further assumed that the phase differential or delay α is less than the 0° phase position. The circuit response based on these conditions is presented accordingly.

Figure 7A:
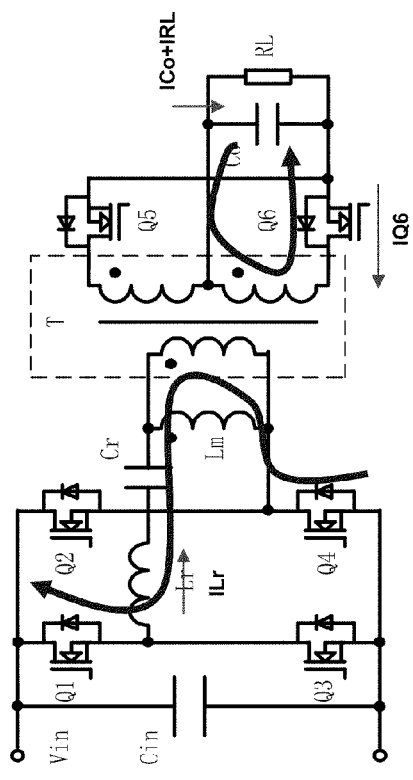
FIGS. 7A-7E are timing diagrams depicting the behavior of the resonant converter over time in response to compensating for a phase shift differential between a primary and secondary driver having a calculated dead-time that is less than the phase shift between the drivers, according to various embodiments.
Figure 7A:
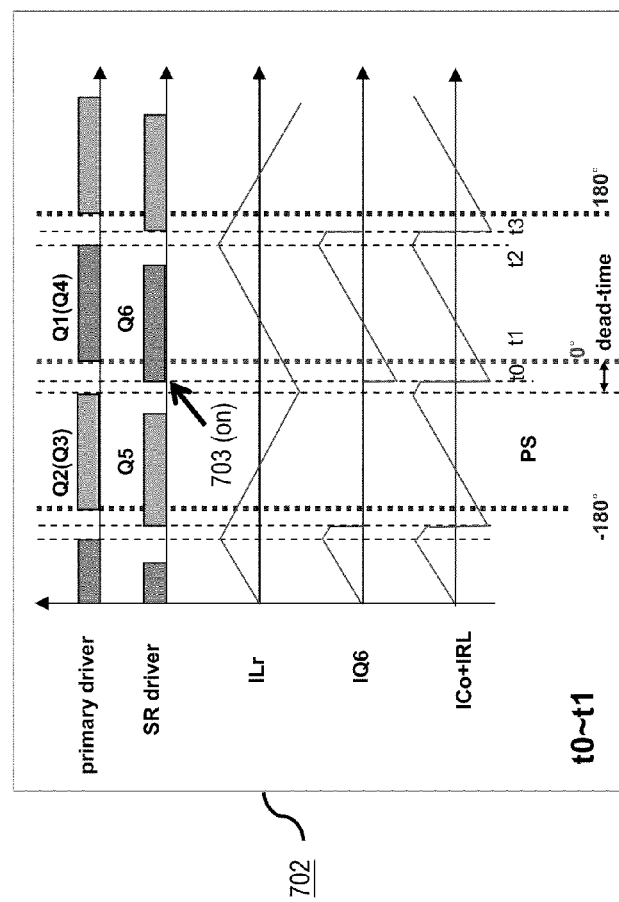

FIG. 7A depicts the following:
During time t0 to t1:
1. After SR Q6 turns ON 703, as represented in 702, SR Q6 is forced to conduct current IQ6, as represented in 700.
2. Because the flow of ILr is from switching element Q1 to Q4s body diode, as represented in 700, current IQ6 has to flow from drain side to source, resulting in a discharge of current through capacitor Co, as represented in 702.

Figure 7B:
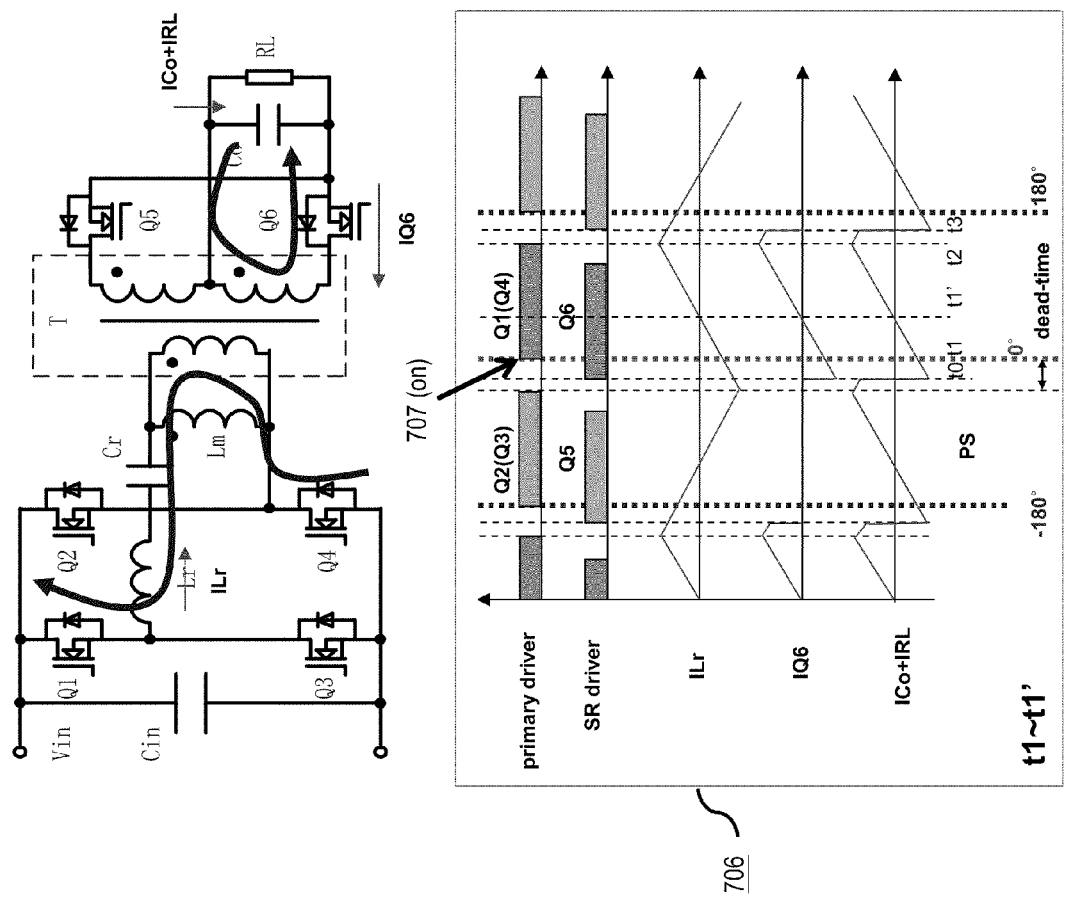

FIG. 7B depicts the following:
During time t1 to t1':
1. Switching elements Q1 and Q4 are turned ON, as represented in 706, causing the current ILr through the resonant inductor to flow through them, as represented in 704.
2. Because at this point ILr has not changed direction, the current IQ6 of the SR Q6 still flows from drain side to source, and discharges current ICo across the capacitor Co, as represented in 706.

Figure 7C:
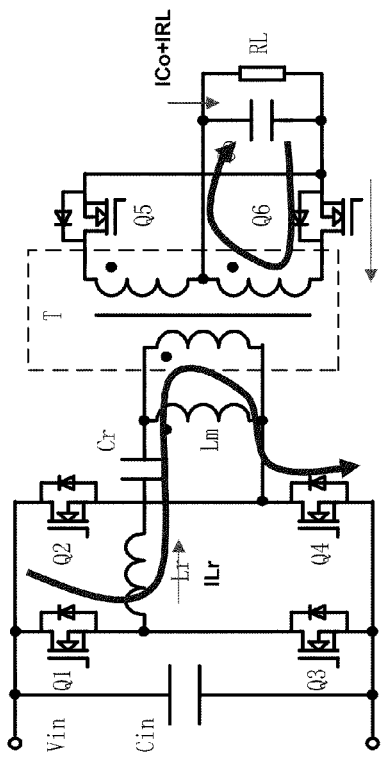
Figure 7C:
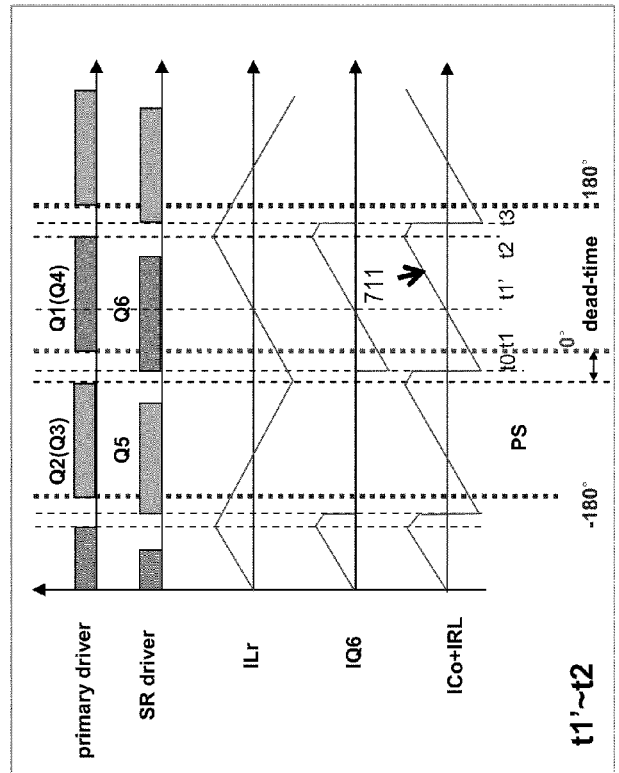

FIG. 7C depicts the following:
During time t1' to t2:
1. The current through the resonant inductor ILr changes its direction of flow after time t2', as represented in 708 and 710.
2. The current IQ6 through SR Q6 will flow from source side to drain, and charge the capacitor Co, as shown in the ramp-up waveform 711.

Figure 7D:
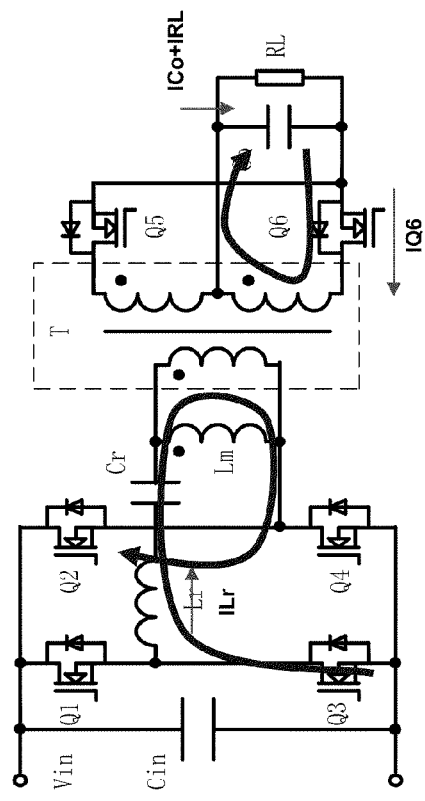
Figure 7D:
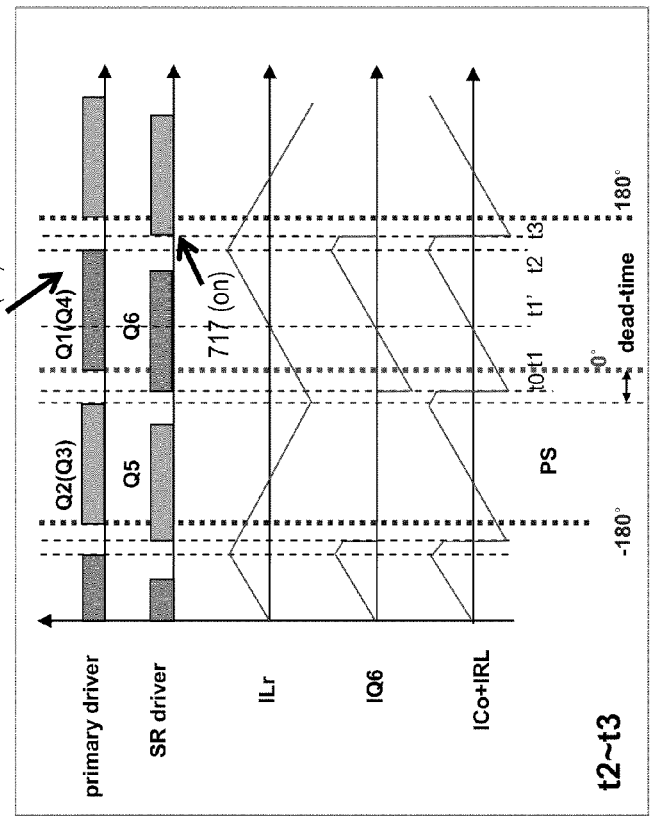

FIG. 7D depicts the following:

During t2 to t3:

1. After switching elements Q1 and Q4 are turned OFF 715, as represented in 714, the current ILr flowing through the resonant inductor has to flow through the body diodes of switching elements Q2 and Q3, as represented in 712.
2. Because the current ILr through the inductor has the same direction as it did during the time period t1' to t2, as represented in 712 and 714, the current IQ6 through SR Q6 still flows from drain side to source, and charges capacitor Co, as represented in 715.
3. After time t3, SR Q5 turns ON 717; the operational process is the same as SR Q6.

Figure 7E:
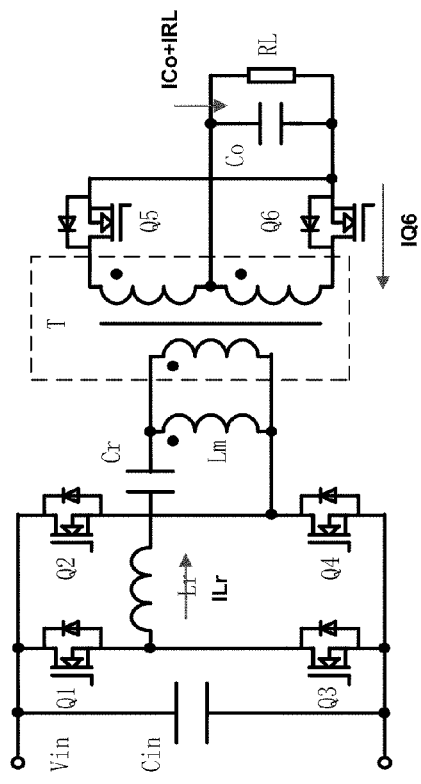
Figure 7E:
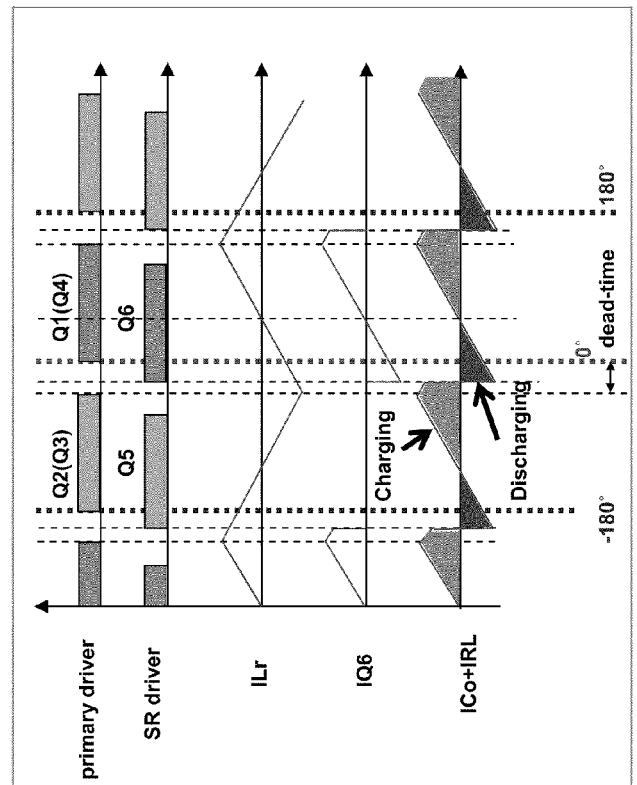

FIG. 7E depicts a summary of FIGS. 7A-7D that presents the following:

For the duration of time t0 to t3:

1. The summation of current values through the capacitor and load resistance ICo+IRL equals the sum of current values IQ5 and IQ6 that flowed through SRs Q5 and Q6 respectively.
2. The current waveform produced from summation of ICo+IRL, as represented in 720, shows the charging current over time atop the x-axis of the waveform and discharging current below the x-axis.
3. The average charging current is larger than discharging current, as represented in 720. Therefore, a compensatory effect is attained for enabling the load voltage Vo to be charged to a proper level. It is noted that this approach for regulating the voltage gain of the resonant converter is responsive to a phase delay, dead-time and/or switching frequency as monitored, determined and regulated by the phase shift module 107.

Figure 8:
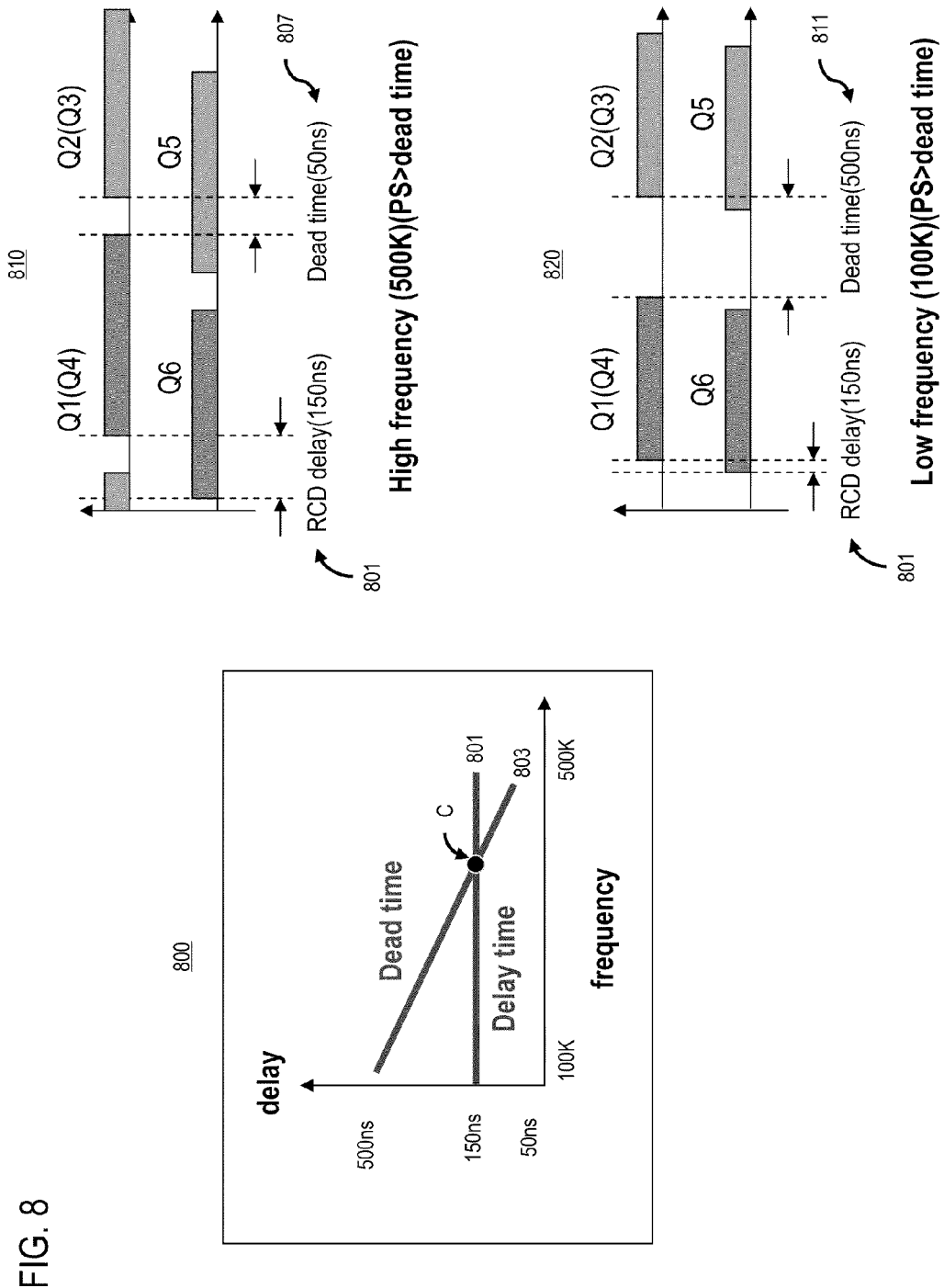
FIG. 8 is a diagram depicting a phase shift regulation response of a resonant converter, in accordance with an exemplary embodiment.

FIG. 8 is a diagram depicting a phase shift regulation response of a resonant converter, in accordance with an exemplary embodiment. It is noted that the RCD delay circuit 521 of the phase shift module 503 introduces an intentional delay in the execution of the primary driver 103 via application of signal input $S_1$. This delay corresponds to the degree of phase shift (differential) introduced to the resonant converter for affecting voltage gain. By way of example, the delay introduced by the RCD delay circuit may be 150 ns, remains constant over ever increasing frequency ranges, as depicted by horizontal line 801 of graph 800. In timing diagrams 810 and 820, the RCD delay is shown to be the same for both high (e.g., up to 500K) and low frequency ranges (e.g., 100K) respectively. Conversely, the dead-time characteristic of the resonant converter circuit decreases over ever increasing frequency ranges, as depicted by declining line 803 of graph 800. This is illustrated by way of example in timing diagram 810 as well, where for high frequency applications the dead-time 809 is less than the RCD delay time 801 (e.g., 50 ns<150 ns). The dead-time characteristic increases over ever decreasing frequency ranges, as depicted by the incline of line 803 of graph 800. This is illustrated by way of example in timing diagram 820, where for low frequency applications the dead-time 811 is greater than the constant delay 801 (e.g., 500 ns>150 ns).

It is noted therefore that for varying operating frequencies, the RCD delay time is maintained constant, but the dead time between respective switching elements Q1(Q4) and Q2(Q3) of the resonant circuit is regulated according to the shown graph 800. Consequently, when the frequency changes, the phase shift degree or differential between the primary switches and the corresponding SRs Q5 and Q6 are also regulated. Also, as the dead time approximates the delay time according to the same frequency response, corresponding to intersection point C, the phase degree differential between the primary switches and the corresponding SRs 201 and 203 is impacted. For instance, when the frequency moves up, the differential is higher and thus necessitates a full delay, while at lower frequencies, the phase shift differential is lower, thus necessitating a lessened delay (<150 ns). It is noted as an advantage that the frequency response and phase shift differential of a resonant converter 101 can be modulated simultaneously by way of the configuration of FIG. 5A or FIG. 5D.

It is noted that the exemplary system and techniques discussed herein provide a convenient means for regulating key characteristics of a resonant converter circuit, and in particular, design implementations that take advantage of synchronous rectifiers for enabling active switching. By configuring the resonant circuit 101 with a phase shift module 107, the resonant converter is able to adjust its voltage gain characteristics, account for dead-time between corresponding switching elements and respond to varying switching frequencies. The DC gain of the resonant converter can be lowered by shifting the phase of the secondary driver before the corresponding primary driver to some degree.

In addition, the system accounts for the charge pump effect resulting from light load operation with respect to parasitic capacitor implementation or the inherent effect thereof. Consequently, the exemplary embodiments allow for phase shift control to still attain lower voltage gains under varying frequency ranges and design considerations. It is noted that the above described techniques result in reduced voltage or current stress of the components of the circuitry and improves the stability and reliability of the circuit.

The above described advantages may be applied to any resonant converter configuration, including but not limited to LLC, LCC, parallel, series, and combinations thereof. Also, the processes described herein for controlling a direct current gain of a resonant converter to increase power efficiency within a circuit may be advantageously implemented via software, hardware, firmware or a combination of software and/or firmware and/or hardware. For example, digital signal processing control may be used to enable frequency and phase modularity; such that the drivers and/or controller can be generated within the phase shift module 107/503 by comparing triangle wave signals with register value signals. With this approach, frequency is regulated by the triangle wave count value, while the delay time is varied by changing the compare register value of the DSP chip. The processes described herein may also be implemented with an Application Specific Integrated Circuit (ASIC), Field Programmable Gate Arrays (FPGAs), etc.

Figure 9:
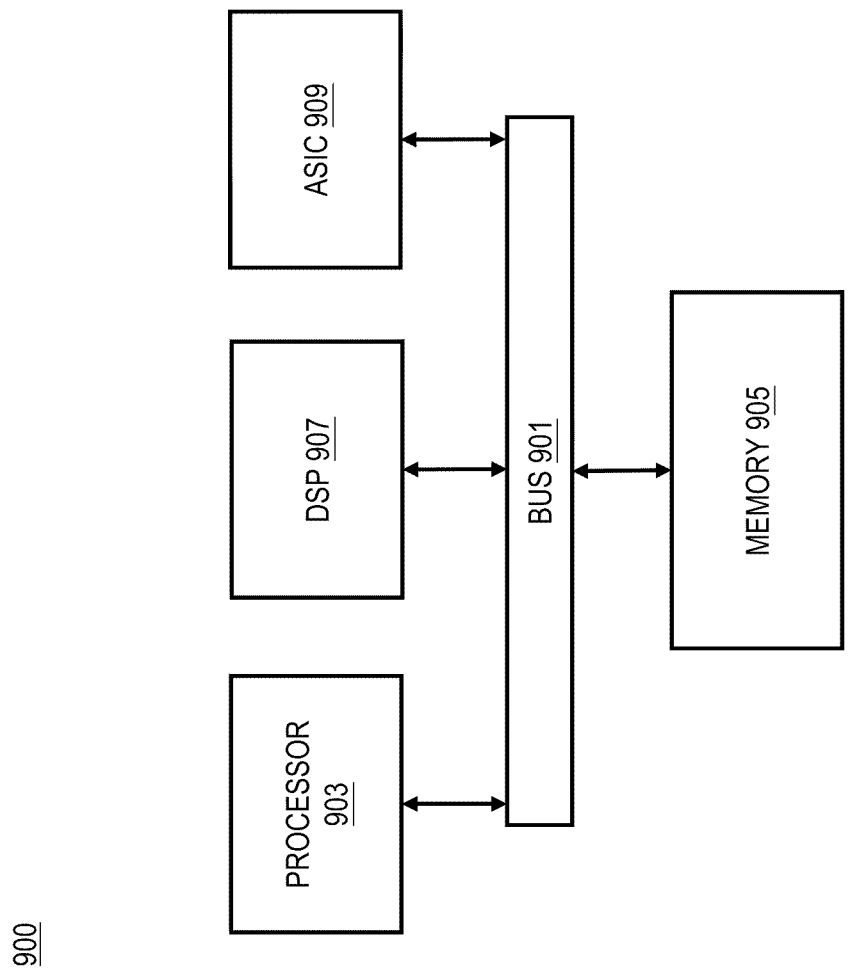
FIG. 9 is a diagram of a chip set that can be used to implement various exemplary embodiments.

FIG. 9 is a diagram of a chip set that can be used to implement various exemplary embodiments. Chip set 900 is programmed for controlling a direct current gain of a resonant converter to increase power efficiency within a circuit as described herein and includes, for instance, the processor and memory components incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 900 can be implemented in a single chip. It is further contemplated that in certain embodiments the chip set or chip 900 can be implemented as a single "system on a chip." It is further contemplated that in certain embodiments a separate ASIC would not be used, for example, and that all relevant functions as disclosed herein would be performed by a processor or processors. Chip set or chip 900, or a portion thereof, constitutes a means for performing one or more steps for controlling a direct current gain of a resonant converter to increase power efficiency within a circuit.

In one embodiment, the chip set or chip 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein for controlling a direct current gain of a resonant converter to increase power efficiency within a circuit. The memory 905 also stores the data associated with or generated by the execution of the inventive steps.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
    generating a first control signal to control a primary driver of a resonant converter; and
    generating a secondary control signal to control a secondary driver of the resonant converter, wherein the first control signal and the secondary control signal have a phase shift for controlling a DC gain of the resonant converter, and the phase shift is defined as a phase difference between the turning on of synchronous rectifiers of the resonant converter which are driven by the secondary driver and primary switching elements of the resonant converter which are driven by the primary driver.

2. The method of claim 1, wherein the phase shift is from −180 degree to 180 degree.

3. The method of claim 1, wherein the phase shift is from −180 degree to zero degree.

4. The method of claim 1, wherein the primary drivers are configure to drive a plurality of primary switching elements, the method further comprising:
    determining a dead-time associated with the switching elements.

5. The method of claim 4, wherein the phase shift is from dead-time phase degree to zero degree.

6. The method of claim 4, wherein the phase shift is from dead-time phase degree to diode-conducting phase degree.

7. The method of claim 4, further comprising:
    determining a time delay associated with the switching elements, wherein the phase shift is based on the dead-time, the time delay, or a combination thereof.

8. The method of claim 4, further comprising:
    receiving an output signal from the resonant converter as feedback for generating the first control signal and the secondary control signal.

9. An apparatus comprising:
    a delay circuit; and
    a control module coupled to the delay circuit, and configured to output to the delay circuit for generating a first control signal to control a primary driver of a resonant converter, and to generate a secondary control signal to control a secondary driver of the resonant converter,
    wherein the first control signal and the secondary control signal have a phase shift for controlling a DC gain of the resonant converter, and the phase shift is defined as a phase difference between the turning on of synchronous rectifiers of the resonant converter which are driven by the secondary driver and primary switching elements of the resonant converter which are driven by the primary driver.

10. The apparatus of claim 9, wherein the phase shift is from −180 degree to 0 degree.

11. The apparatus of claim 9, wherein the phase shift is from dead-time phase degree to zero degree.

12. The apparatus of claim 9, wherein the phase shift is from dead-time phase degree diode-conducting phase degree.

13. The apparatus of claim 9, further comprising:
    an error amplifier configured to receive the output voltage of the resonant converter and to generate a compensating error voltage as input to the control module.

14. The apparatus of claim 13, further comprising:
    circuitry coupled between the error amplifier and the control module to provide either frequency switching or dead-time control.

15. An apparatus comprising:
    a resonant converter including a primary driver and a secondary driver; and
    a phase shift module coupled to the primary driver and the secondary driver, the phase shift module being configured to generate a first control signal to control the primary driver, and to generate a secondary control signal to control the secondary driver,
    wherein the first control signal and the secondary control signal have a phase shift for controlling a DC gain of the resonant converter, and the phase shift is defined as a phase difference between the turning on of synchronous rectifiers of the resonant converter which are driven by the secondary driver and primary switching elements of the resonant converter which are driven by the primary driver.

16. The apparatus of claim 15, wherein the phase shift is from −180 degree to zero degree.

17. The apparatus of claim 15, wherein the primary drivers are configured to drive a plurality of primary switching elements, the phase shift module being configured to determine a dead-time associated with the switching elements of the drivers.

18. The apparatus of claim 15, wherein the phase shift is from dead-time phase degree to zero degree.

19. The apparatus of claim 15, wherein the phase shift is from dead-time phase degree to diode-conducting phase degree.

20. The apparatus of claim 17, wherein the phase shift module is further configured to receive an output signal from the resonant converter as feedback for generating the first control signal and the secondary control signal.

21. The apparatus of claim 20, wherein the phase shift module includes:
   an error amplifier configured to receive the output voltage and to generate a compensating error voltage; and
   a resonant converter control module coupled to the error amplifier and configured to receive the compensating error voltage for conditioning to output the first control signal and the secondary control signal.

22. The apparatus of claim 17, wherein the phase shift module includes a feedback circuit, voltage controlled oscillator (VCO), and a phase shift controller.

23. The apparatus of claim 9, wherein the control module is further configured to receive an output signal from the resonant converter for generating the first control signal and the secondary control signal.

24. The apparatus of claim 9, wherein the control module is further configured to generate the first control signal and the secondary control signal in response to an output voltage of the resonant converter.

* * * * *